(12) United States Patent
Chiken

(10) Patent No.: US 8,001,847 B2
(45) Date of Patent: Aug. 23, 2011

(54) CORIOLIS MASS FLOWMETER

(75) Inventor: Yoshihiro Chiken, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 12/979,465

(22) Filed: Dec. 28, 2010

(65) Prior Publication Data
US 2011/0154915 A1 Jun. 30, 2011

(30) Foreign Application Priority Data

Dec. 29, 2009 (JP) ................................ 2009-299173

(51) Int. Cl.
*G01F 1/84* (2006.01)
(52) U.S. Cl. ................................................. 73/861.357

(58) Field of Classification Search ............. 73/861.357, 73/861.356, 861.355; 324/76.52
See application file for complete search history.

(56) References Cited

U.S. PATENT DOCUMENTS 5,767,665 A * 6/1998 Morita et al. ............... 324/76.52
5,844,408 A * 12/1998 Yoshimura et al. ........ 324/76.52

FOREIGN PATENT DOCUMENTS

JP 2009-063382 A 3/2009

* cited by examiner

*Primary Examiner* — Jewel Thompson
(74) *Attorney, Agent, or Firm* — Sughrue Mion, PLLC

(57) ABSTRACT

There is provided a Coriolis mass flowmeter. The flowmeter is configured to vibrate a pipe line through which a fluid flows and measure a mass flow rate of the fluid flowing through the pipe line, based on a phase difference between an upstream vibration signal and a downstream vibration signal, wherein the upstream vibration signal is detected in an upstream side of the pipe line, and the downstream vibration signal is detected in a downstream side of the pipe line.

6 Claims, 16 Drawing Sheets

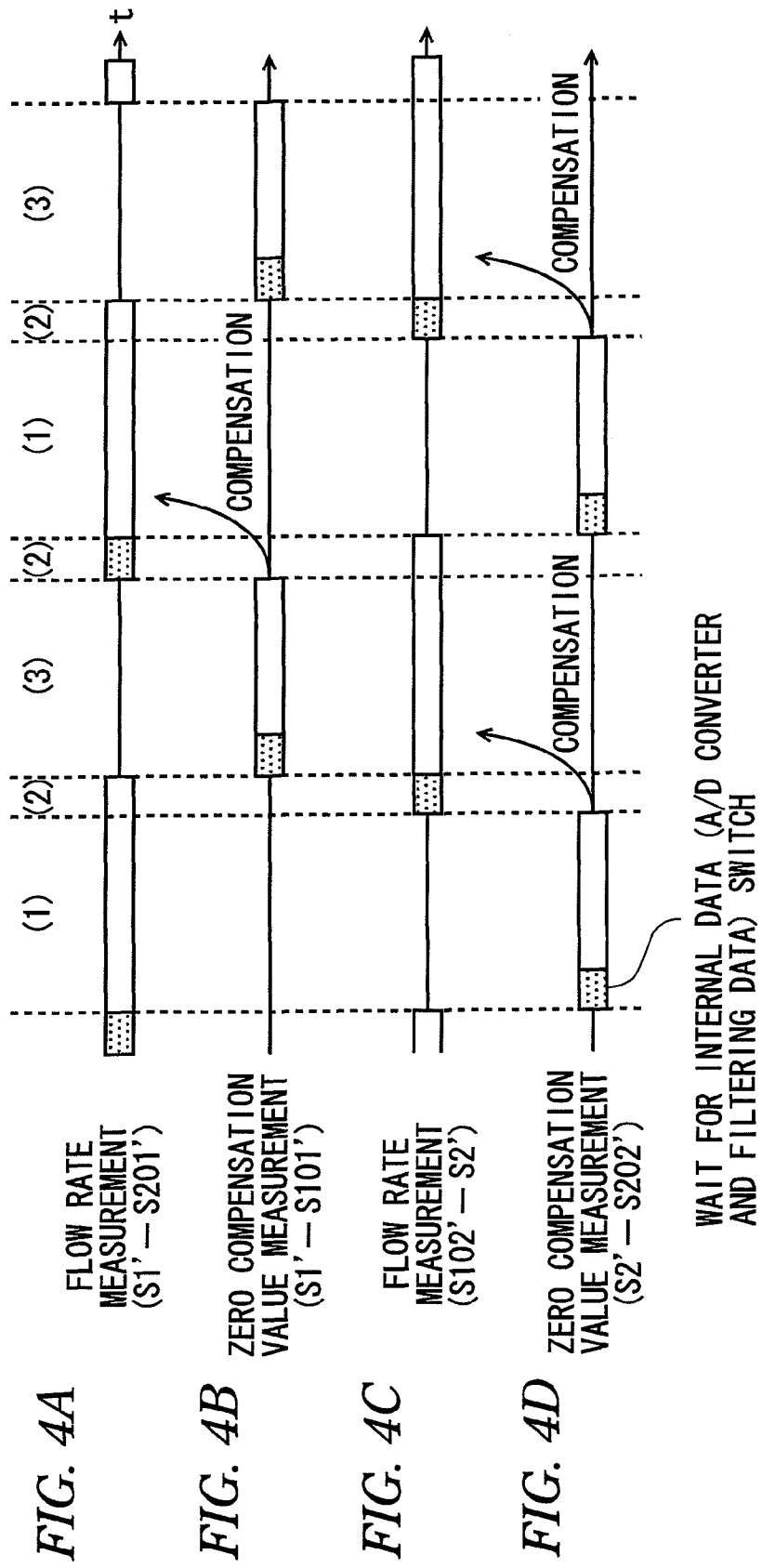

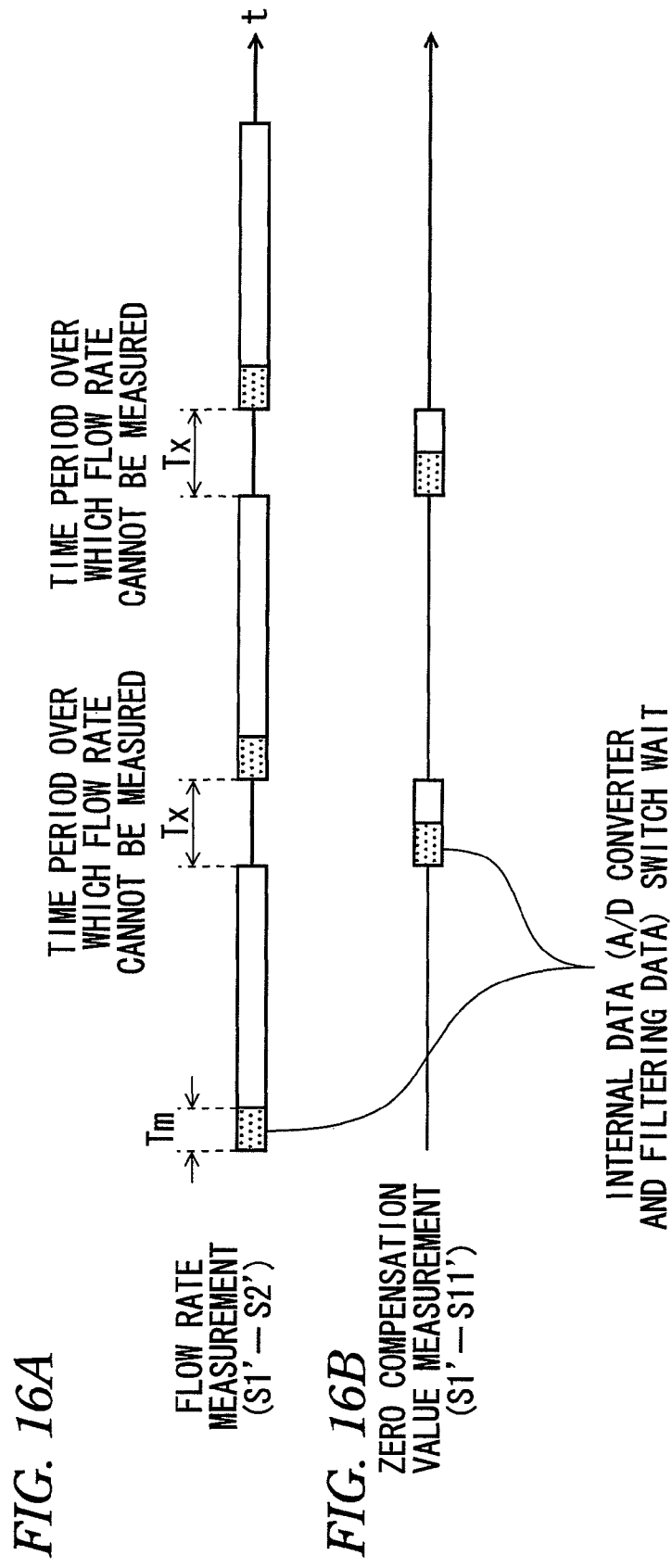

CORIOLIS MASS FLOWMETER

This application claims priority from Japanese Patent Application No. 2009-299173, filed on Dec. 29, 2009, the entire contents of which are herein incorporated by reference.

BACKGROUND

1. Technical Field

The present disclosure relates to a Coriolis mass flowmeter.

2. Related Art

Recently, a Coriolis mass flowmeter for measuring the mass flow rate, the density, the volume flow rate, etc., of a fluid has been often used. According to the Coriolis mass flowmeter, a tube through which a fluid flows is vibrated and the mass flow rate of the fluid flowing through the tube is measured from the phase difference between vibration detection signals at different two upstream and downstream points of the tube. Paying attention to a detection method of a phase difference of the Coriolis mass flowmeter, the Coriolis mass flowmeter is roughly classified into that using an analog detection method and a digital detection method.

The analog detection method is a method of finding the point in time at which each of the amplitudes of detection signals obtained from an upstream sensor (pickup coil) and a downstream sensor become 0 (zero cross point) and detecting the phase difference between the detection signals from the time difference between the zero cross points.

In contrast, the digital detection method is a detection method of sampling detection signals obtained in an upstream sensor and a downstream sensor at the same timing, converting the signals into digital signals, and performing predetermined signal processing for the digital signals, thereby detecting the phase difference between the detection signals. As the signal processing performed for detecting the phase difference between the detection signals, DFT (Discrete Fourier Transform) processing and Hilbert transformation processing are known.

For example, JP-A-2009-063382 (especially, see page 4, FIG. 1) discloses a Coriolis mass flowmeter adopting a digital detection method of this kind. FIG. 12 is a block diagram showing a general configuration example of a Coriolis mass flowmeter 500 according to a conventional example. The Coriolis mass flowmeter 500 shown in FIG. 12 includes a detector 60 and a converter 75.

The detector 60 vibrates a tube 15 (pipe line) through which a fluid to be measured flows and detects upstream and downstream vibration frequencies, vibration phases, and fluid temperatures. The detector 60 includes support members 16 and 17, an exciter 61, an upstream sensor 62, a downstream sensor 63, and a temperature sensor 64. The support members 16 and 17 fix and support the tube 15. The fluid in the tube 15 flows from the left to the right of the plane of the drawing.

In the example, the exciter 61 is placed above a midpoint of the support members 16 and 17, excites the tube based on a vibration control signal S, and vibrates the tube 15. The upstream sensor 62 is placed on the right side of the support member 16 and in the proximity of the tube 15, detects vibration of the upstream fluid, and outputs an upstream coil signal S1 (pickup signal) to the converter 75.

The downstream sensor 62 is placed on the left side of the support member 17 and in the proximity of the tube 15, detects vibration of the downstream fluid, and outputs a downstream coil signal S2 (pickup signal) to the converter 75. In the example, the temperature sensor 64 is provided on the right side of the support member 17 and in contact with the tube 15, detects the temperature of the fluid (detector 60), and outputs a temperature detection signal S9 to the converter 75. The converter is connected to the exciter 61, the upstream sensor 62, the downstream sensor 63, and the temperature sensor 64.

FIG. 13 is a schematic representation showing a vibration mode example of the tube 15. According to the vibration mode example of the tube 15 shown in FIG. 13, when a vibration control signal S7 is supplied from the converter 75 to the exciter 61, the tube 15 is vibrated in a primary mode indicated by signs M1 and M2 in FIG. 13, for example. The primary mode refers to a vibration state appearing only in portions where nodes of vibration are fixed and supported by the support members 16 and 17. When a fluid flows into the tube 15 in such a vibration state, the tube 15 vibrates in a secondary mode indicated by signs M3 and M4 in the figure, for example. The secondary mode refers to a vibration state appearing in portions where nodes of vibration are fixed and supported by the support members 16 and 17 and an intermediate position. In fact, the tube 15 vibrates a composite vibration mode provided by superposing the two types of vibration modes.

FIG. 14 is a block diagram showing an internal configuration example of the Coriolis mass flowmeter 500. The detector 60 shown in FIG. 14 includes an upstream coil L1, a downstream coil L2, a drive coil L3, and a resistance temperature detector RTD. The drive coil L3 excites the tube 15 based on the vibration control signal S7 and induces vibration. The upstream coil L1 detects vibration of the tube 15 and outputs the upstream coil signal S1. The downstream coil L2 detects vibration of the tube 15 and outputs the downstream coil signal S2. The resistance temperature detector RTD measures the temperature of the tube and outputs the temperature detection signal S9.

The converter 75 finds the phase difference between the upstream coil signal S1 and the downstream coil signal S2 detected by the detector 60 and finds the mass flow rate of the fluid flowing through the tube 15. The converter 75 includes input amplifiers 1 and 2, a switch circuit 3, A/D converters 4 and 9, a digital signal processing circuit 5, a CPU 6, a drive circuit 7, an RTD drive circuit 8, output circuits 10 and 11, a display 12, a frequency measuring circuit 13, and a timing generator 85.

The input amplifier 1 is connected to the upstream coil L1, amplifies the upstream coil signal S1, and outputs the post-amplified upstream coil signal S1 to the A/D converter 4. The switch circuit 3 for switching a path is connected to the downstream coil L2 and switches the path so as to select an upstream coil signal S11 after branch or the downstream coil signal S2 from the detector 60. The switch circuit 3 is used to execute a function of zero point signal compensation (hereinafter, simply called zero compensation) of the portion of the input amplifier 1, 2.

The input amplifier 2 is connected to the switch circuit 3, amplifies the upstream coil signal S11 or the downstream coil signal S2, and outputs the post-amplified upstream coil signal S11 or downstream coil signal S2 to the A/D converter 4. The A/D converter 4 converts the post-amplified upstream coil signal S1, S1 into a digital signal S1', S1', and outputs the digital upstream coil signal S1', S1' to the digital signal processing circuit 5.

The A/D converter 4 converts the post-amplified upstream coil signal S11 or downstream coil signal S2 into digital signals S11' and S2' and outputs the digital upstream coil signal S11' or the digital downstream coil signal S2' to the digital signal processing circuit 5. The A/D converter 4 uses a two-channel A/D converter having a function capable of sampling the upstream coil signal S1 and the upstream coil signal S11 or the downstream coil signal S2 at the same time.

The digital signal processing circuit 5 inputs the upstream coil signal S1' and the downstream coil signal S2' from the A/D converter 4, calculates the phase difference between the upstream coil signal S1' and the downstream coil signal S2', and outputs a flow rate signal indicating the mass flow rate of the fluid. The CPU 6 converts the phase difference between the flow rate signals into a mass flow rate and performs computation of compensating for the effect caused by the temperature of the detector 60 for a flow rate signal, a density signal, etc. At the time, the CPU 6 computes process variables of mass flow rate, accumulated mass flow rate, fluid density, etc.

The drive circuit 7 positively feeds back the upstream coil signal S1 or the downstream coil signal S2 and excites the drive coil L3 at a unique oscillation frequency f0 of the tube 15 through which a fluid flows. The RTD drive circuit 8 outputs a resistance drive signal S8 for setting an operation current in the resistance temperature detector RTD. The A/D converter 9 converts the analog temperature detection signal S9 output from the resistance temperature detector RTD into a digital signal and outputs digital temperature detection data D9 to the CPU 6.

The frequency measuring circuit 13 measures the unique oscillation frequency f0 of the tube 15 excited by the drive circuit 7 and outputs frequency data D13 to the CPU 6. The oscillation frequency f0 is used for density measurement, etc., of a fluid. The unique oscillation frequency f0 of the tube 15 is calculated by the digital signal processing circuit 5 or the CPU 6. The timing generator 85 generates a switch clock signal CK and outputs the signal to the switch circuit 3. The output circuits 10 and 11 output digital flow rate data D5 indicating the flow rate of a fluid based on the mass flow rate computed by the CPU 6. The display 12 displays the flow rate, the mass, the temperature, etc., of a fluid.

FIG. 15 is a waveform chart showing a phase detection example between the upstream coil signal S1 and the downstream coil signal S2. In FIG. 15, the horizontal axis indicates time t and the vertical axis indicates signal level. In the figure, the detection phase waveform indicated by the solid line is the upstream coil signal S1 detected in the upstream coil L1 in the Coriolis mass flowmeter 500. The detection phase waveform indicated by the dotted line is the downstream coil signal S2 detected in the downstream coil L2. Up arrows denote signal sampling timings T0, T1, T2, . . . in the A/D converter 4.

According to the phase relationship between the upstream coil signal S1 and the downstream coil signal S2 shown in FIG. 15, the downstream coil signal S2 delays relative to the upstream coil signal S1 and a phase difference occurs between the upstream coil signal S1 and the downstream coil signal S2. The upstream coil signal S1 is amplified in the input amplifier 1 and the downstream coil signal S2 is amplified in the input amplifier 2 and then the signals are sampled in sampling period T and become discrete digital flow rate signals at the point in time indicated by "•" in FIG. 15.

The flow rate signals (digital data) are input and are subjected to digital signal processing in the digital signal processing circuit 5 and the phase difference between the upstream coil signal S1 and the downstream coil signal S2 is found. Since the phase difference between the upstream coil signal S1 and the downstream coil signal S2 is converted into the mass flow rate, it is required that the upstream coil signal S1 and the downstream coil signal S2 should be sampled precisely at the same time.

The upstream coil signal S1 detected in the upstream coil L1 and the downstream coil signal S2 detected in the downstream coil L2 pass through two signal processing paths where they are sampled at the same time in the input amplifiers 1 and 2 and the A/D converter 4 shown in FIG. 14. Thus, if a difference of the effect caused by ambient temperature fluctuation, etc., exists between the two signal processing paths, phase difference output as the final flow data D5 may fluctuate depending on an environmental condition. The fluctuation amount may change due to the unique frequencies of the upstream coil signal S1, the downstream coil signal S2, etc.

Further, the fluctuation amount under the same environmental condition is not necessarily constant because of secular change, etc., of the components and the wiring forming the two signal processing paths. Generally, the accuracy required for the flow rate signal (phase difference signal) of the Coriolis mass flowmeter 500 is equivalent to grad or less. Thus, it becomes necessary to compensate for the effect of the fluctuation caused by the environmental condition, the secular change, etc.

According to the Coriolis mass flowmeter 500 according to the conventional example, the switch circuit 3 selects the downstream coil signal S2 at the flow rate at the flow rate measuring time and the digital signal processing circuit 5 measures the phase difference between the upstream coil signal S1' and the downstream coil signal S2'. At the zero compensation processing time, the switch circuit 3 selects the upstream coil signal S11 at regular time intervals at given period timing based on the clock signal CK.

Specifically, to interrupt flow rate measurement and execute zero point compensation processing, the switch circuit 3 disconnects input of the downstream coil signal S2 and switches the signal processing path of the input amplifier 2 to input of the upstream coil signal S11 and connects to the digital signal processing circuit 5 (sampling hard). The digital signal processing circuit 5 measures the phase difference between the upstream coil signal S1 flowing through the input amplifier 1 and the A/D converter 4 and the upstream coil signal S11 flowing through the input amplifier 2 and the A/D converter 4.

According to the measuring timing described above, the upstream coil signal S1 flowing through the input amplifier 1 and the upstream coil signal S11 flowing through the input amplifier 2 are input to the digital signal processing circuit 5 as the same input waveform. The digital signal processing circuit 5 executes digital signal processing such as filtering of limiting of a passage band, 90-degree phase conversion, etc. Accordingly, the phase difference between the signal processing path of the upstream coil signal S1 flowing through the input amplifier 1 and the signal processing path of the upstream coil signal S11 flowing through the input amplifier 2 can be measured. The output phase difference at this time is used for correction computation by the CPU 6 as a zero compensation value, whereby the effect of the environmental conditions, etc., of the input amplifier 2, the A/D converter 4, etc., is removed.

By the way, the Coriolis mass flowmeter 500 according to the conventional example involves the following problem:

FIGS. 16A and 16B are time charts showing an operation example of the converter 75. FIG. 16A is a time chart showing a flow rate measuring example based on the signal processing path of the upstream coil signal S1 and the signal processing path of the downstream coil signal S2 and FIG. 16B is a time chart showing a zero compensation value measurement example in the signal processing paths of the upstream coil signals S1 and S11. The horizontal axes of FIGS. 16A and 16B indicate time t. Tx shown in FIG. 16A indicates the time period over which the flow rate cannot be measured (flow rate measurement interrupt time period). Tm indicates the switch wait time of internal data of the A/D converter, filtering data, etc.).

(i) In the Coriolis mass flowmeter 500 described in JP-A-2009-063382, the phase difference between the upstream coil signal S1 and the downstream coil signal S2 for calculating a flow rate signal is the order of several mrad (milliradians). For example, to obtain a flow rate signal of 0.1% accuracy, phase difference detection of the wad (microradians) is indispensable.

According to the Coriolis mass flowmeter 500 shown in FIG. 12, it is indispensable to sample and hold the phase difference between the upstream coil signal S1 and the downstream coil signal S2 at the same timing as described with reference to FIGS. 12 and 13, and the AD converter 4 that can sample two channels at the same time becomes necessary. However, the number of types of commercially available A/D converters with completely synchronized two channel sample and hold is small and many of them are expensive.

(ii) To remove phase fluctuation in the input amplifier 1 of the upstream coil signal S1, the input amplifier 2 of the downstream coil signal S1, etc., caused by an environmental condition change, the upstream coil signal S1 is input to the input amplifier 1 and the upstream coil signal S11 is input to the input amplifier 11 by the switch circuit 3 shown in FIG. 14 and a zero compensation value must be found at regular time intervals. Therefore, there is a problem in that in the computing time of the zero compensation value, flow rate measurement cannot be executed during the Tx period shown in FIG. 16A.

In this connection, to shorten the flow rate measurement interrupt time period, a method of increasing the measurement frequency in zero compensation processing is possible, but the number of samples of zero compensation value (average value) is limited and it becomes difficult to obtain sufficient stability.

(iii) According to the Coriolis mass flowmeter 500, when the upstream coil signal S11 and the downstream coil signal S2 are switched by the switch circuit 3, zero compensation value or flow rate measurement cannot immediately be executed. Generally, a sequence of filtering to limit a passage band, etc., is performed in measurement of the phase difference corresponding to the flow rate or the zero compensation value. In the processing, a flow rate signal before switch is held for filtering just after switch of the upstream coil signal S1.

Therefore, flow rate measurement must be awaited by the time period Tm shown in FIG. 16 (A) until the flow rate signal used for the filtering is replaced with a flow rate signal obtained after switch. In the A/D converter 4, just after switch, a digital flow rate signal before switch is held and a measure of wait time occurs until the effect of the flow rate signal before switch disappears.

iv. When measurement of the upstream coil signals S1 and S11 involved in the two amplifiers 1 and 2 is executed once every several seconds to several ten seconds, each zero compensation value calculated in the digital signal processing circuit 5 has fluctuation. When the measurement error of the zero compensation value becomes large, consequently an error of output after zero compensation becomes large.

To calculate a stable zero compensation value, fluctuation needs to be made sufficiently small and a method of increasing the switch frequency of the upstream coil signal S11 and the downstream coil signal S2 or a method of prolonging the measurement time period of a zero compensation value and increasing the number of pieces of data to be averaged is possible. However, there is a problem in that the flow rate measurement interrupt time period Tx described above is prolonged.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

According to one or more aspects of the present invention, there is provided a Coriolis mass flowmeter for vibrating a pipe line through which a fluid flows and measuring a mass flow rate of the fluid flowing through the pipe line, based on a phase difference between an upstream vibration signal and a downstream vibration signal, wherein the upstream vibration signal is detected in an upstream side of the pipe line, and the downstream vibration signal is detected in a downstream side of the pipe line. The flowmeter includes: a flow rate signal calculator including: a first signal processor; and a second signal processor. The upstream vibration signal is divided into at least a first upstream vibration signal that flows through a first path and a second upstream vibration signal that flows through a second path. The downstream vibration signal is divided into at least a first downstream vibration signal that flows through the second path and a second downstream vibration signal that flows through the first path. The first signal processor is provided on the first path to calculate a first flow rate signal that represents a phase difference between the first upstream vibration signal and the second downstream vibration signal, and then correct the calculated first flow rate signal. The second signal processor is provided on the second path to calculate a second flow rate signal that represents a phase difference between the second upstream vibration signal and the first downstream vibration signal, and then correct the calculated second flow rate signal.

According to one or more aspects of the present invention, the first signal processor is configured to calculate a first zero compensation value, based on at least one of the upstream vibration signal (S1), the downstream vibration signal (S2) and a certain reference signal, and the first signal processor is configured to correct the calculated first flow rate signal based on the first zero compensation value. The second signal processor is configured to calculate a second zero compensation value, based on at least one of the upstream vibration signal (S1), the downstream vibration signal (S2) and the certain reference signal, and the second signal processor is configured to correct the calculated second flow rate signal based on the second zero compensation value. The corrected first flow rate signal and the corrected second flow rate signal are alternately repeated without time interval therebetween.

According to one or more aspects of the present invention, the upstream vibration signal is divided into a third upstream vibration signal that flows through the first path, in addition to the first upstream vibration signal and the second upstream vibration signal, and the downstream vibration signal is divided into a third downstream vibration signal that flows through the second path, in addition to the first downstream vibration signal and the second downstream vibration signal. The flowmeter further includes: a first switch circuit provided on the first path to switch between the third upstream vibration signal and the second downstream vibration signal; and a second switch circuit provided on the second path to switch between the third downstream vibration signal and the second upstream vibration signal. The first signal processor is configured to calculate the first zero compensation value, based on a phase difference between the first upstream vibration signal and the third upstream vibration signal. The second signal processor is configured to calculate the second zero compensation value, based on a phase difference between the first downstream vibration signal and the third downstream vibration signal. The flow rate signal calculator further includes: a signal selector configured to alternately output the corrected first flow rate signal and the corrected second flow rate signal. The first signal processor calculates the first flow rate signal or the first zero compensation value, while the second signal processor detects the second flow rate signal. The second signal processor calculates the second flow rate signal or the second zero compensation value, while the first signal processor detects the first flow rate signal.

According to one or more aspects of the present invention, the Coriolis mass flowmeter further includes: a reference signal generator configured to generate the certain reference signal, wherein the certain reference signal is divided into a first reference signal, a second reference signal, a third reference signal and a fourth reference signal; a first switch circuit provided on the first path to switch between the first upstream vibration signal and the first reference signal; a second switch circuit provided on the first path to switch between the second downstream vibration signal and the second reference signal; a third switch circuit provided on the second path to switch between the second upstream vibration signal and the third reference signal; and a fourth switch circuit provided on the second path to switch between the first downstream vibration signal and the fourth reference signal.

According to one or more aspects of the present invention, the first signal processor includes: a first zero compensation value generator configured to calculate the first zero compensation value, based on a phase difference between the first reference signal and the second reference signal. The second signal processor includes: a second zero compensation value generator configured to calculate the second zero compensation value, based on a phase difference between the third reference signal and the fourth reference signal.

According to one or more aspects of the present invention, the flow rate signal calculator includes: a controller configured to diagnose the first and second paths based on the first and second zero compensation values, respectively.

According to the present invention, measurement of the phase difference between the vibration signals corresponding to the flow rate signals and measurement of the zero compensation value of the vibration signal can be executed concurrently, so that it is made possible to correct the fluctuation factor of flow rate measurement caused by a change in the environmental condition of the signal path, etc. A sufficient number of samples of the zero compensation values (average values) of the vibration signals can be ensured, the error component contained in the zero compensation value can be decreased, and stable flow rate measurement is made possible.

Moreover, the need for synchronizing the upstream vibration signal and the downstream vibration signal with each other, sampling, and executing analog-to-digital conversion as in the conventional example is eliminated, and it is made possible to use a general-purpose A/D converter. Accordingly, it becomes easy to select components in the flow rate signal calculator, and the cost of the Coriolis mass flowmeter can be reduced.

Other aspects and advantages of the present invention will be apparent from the following description, the drawings and the claims.

BRIEF DESCRIPTION OF THE DRAWINGS

In the accompanying drawings:

FIGS. 4A to 4D are time charts showing an operation example (No. 2) of the converter 71;

FIGS. 16A and 16B are time charts showing an operation example of a converter 75.

DETAILED DESCRIPTION OF EXEMPLARY EMBODIMENTS

Figure 1:
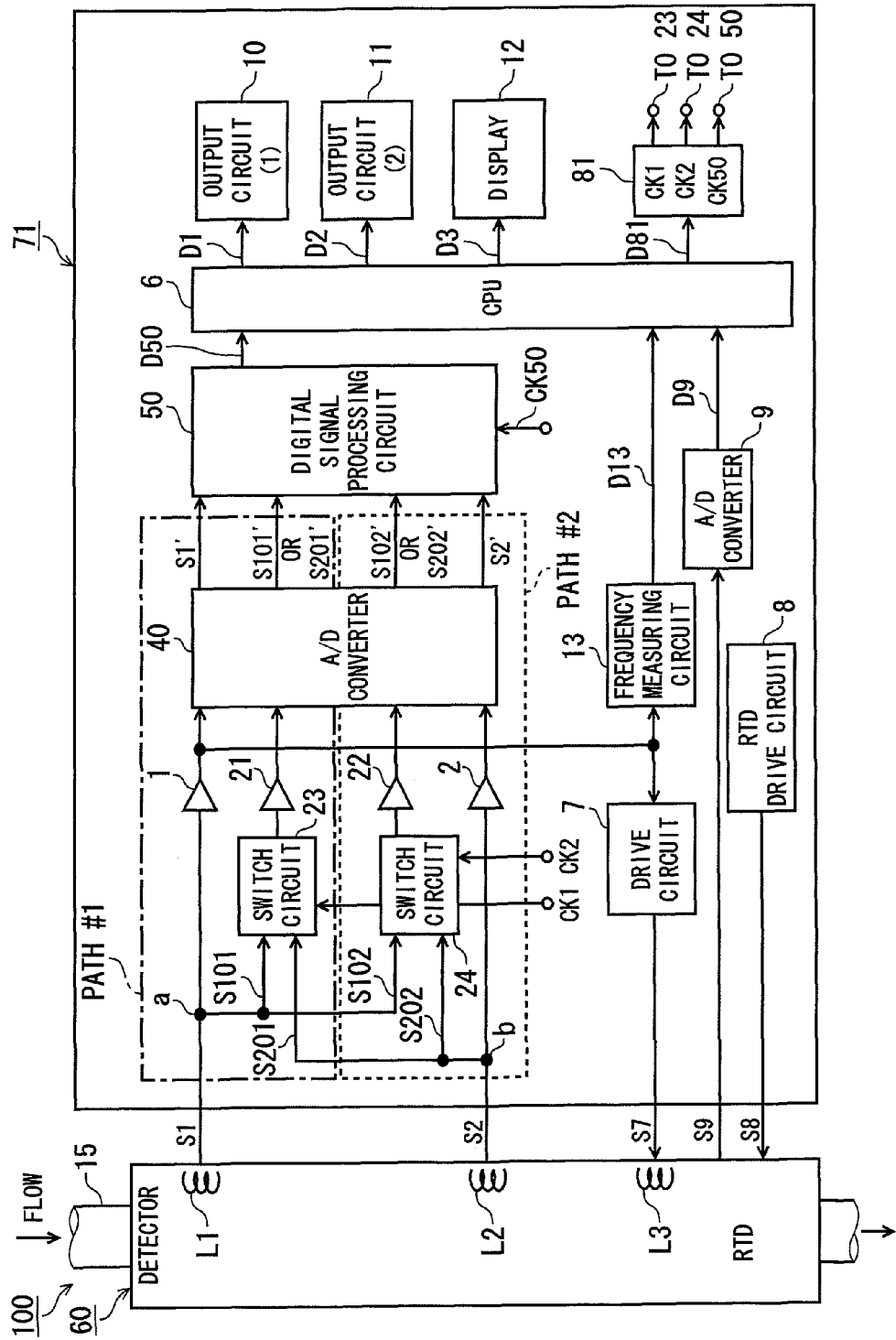
FIG. 1 is a block diagram showing a configuration example of a Coriolis mass flowmeter 100 according to a first embodiment of the invention.

Hereinafter, exemplary embodiments of the present invention will be described with reference to the accompanying drawings.

First Embodiment

In a first embodiment, to simply the description, a straight-pipe-type Coriolis mass flowmeter 100 of a digital signal processing system will be discussed. The Coriolis mass flowmeter 100 shown in FIG. 1 vibrates a pipe line (tube 15) through which a fluid flows, and measures the mass flow rate of a fluid flowing through the tube 15 from the phase difference between upstream vibration and downstream vibration of the tube. The Coriolis mass flowmeter 100 includes a detector 60 and a converter 71.

The detector 60 includes an upstream coil L1, a downstream coil L2, a drive coil L3, and a resistance temperature detector (RTD). The upstream coil L1 is provided in the upstream sensor 62 shown in FIG. 12, detects upstream vibration of the tube 15, and outputs an upstream coil signal as an example of a vibration signal S1 to the converter 71.

Figure 12:
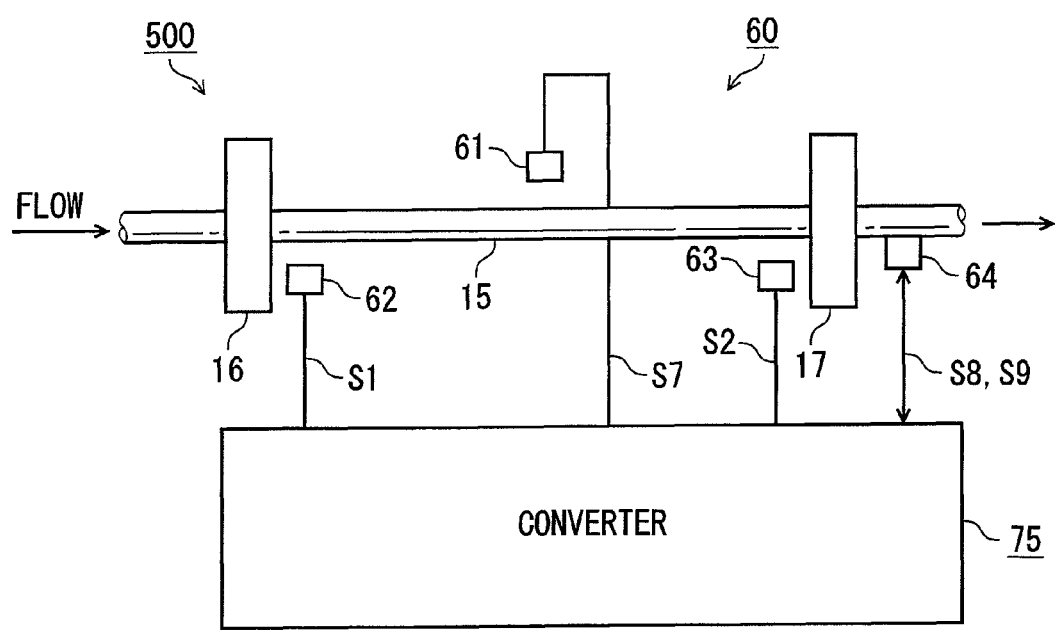
FIG. 12 is a block diagram showing the general configuration of a Coriolis mass flowmeter 500 in a related-art.
Figure 13:
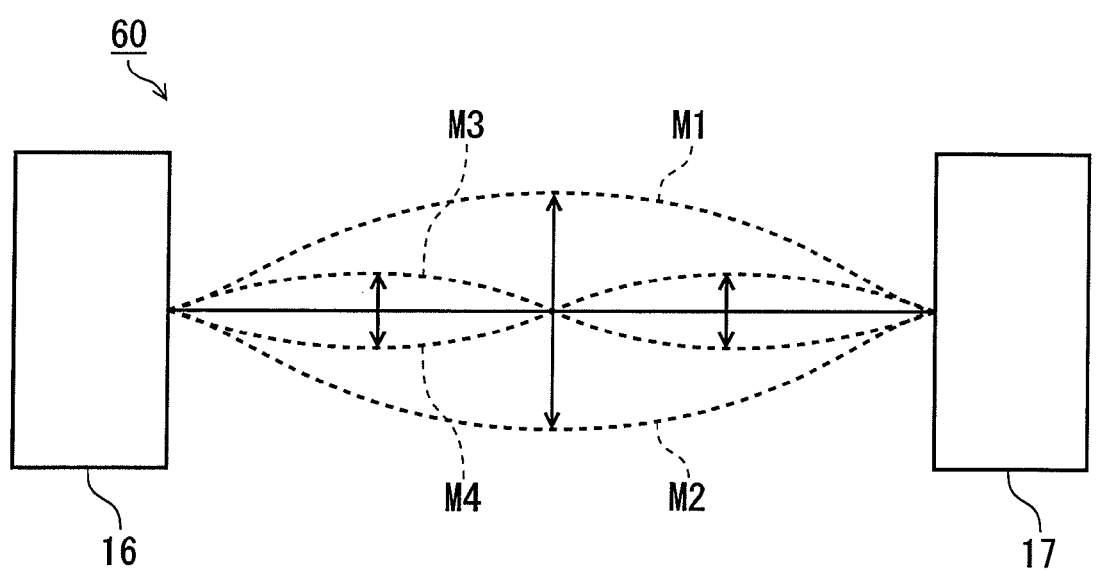
FIG. 13 is a schematic representation showing a vibration mode example of a tube 15.
Figure 14:
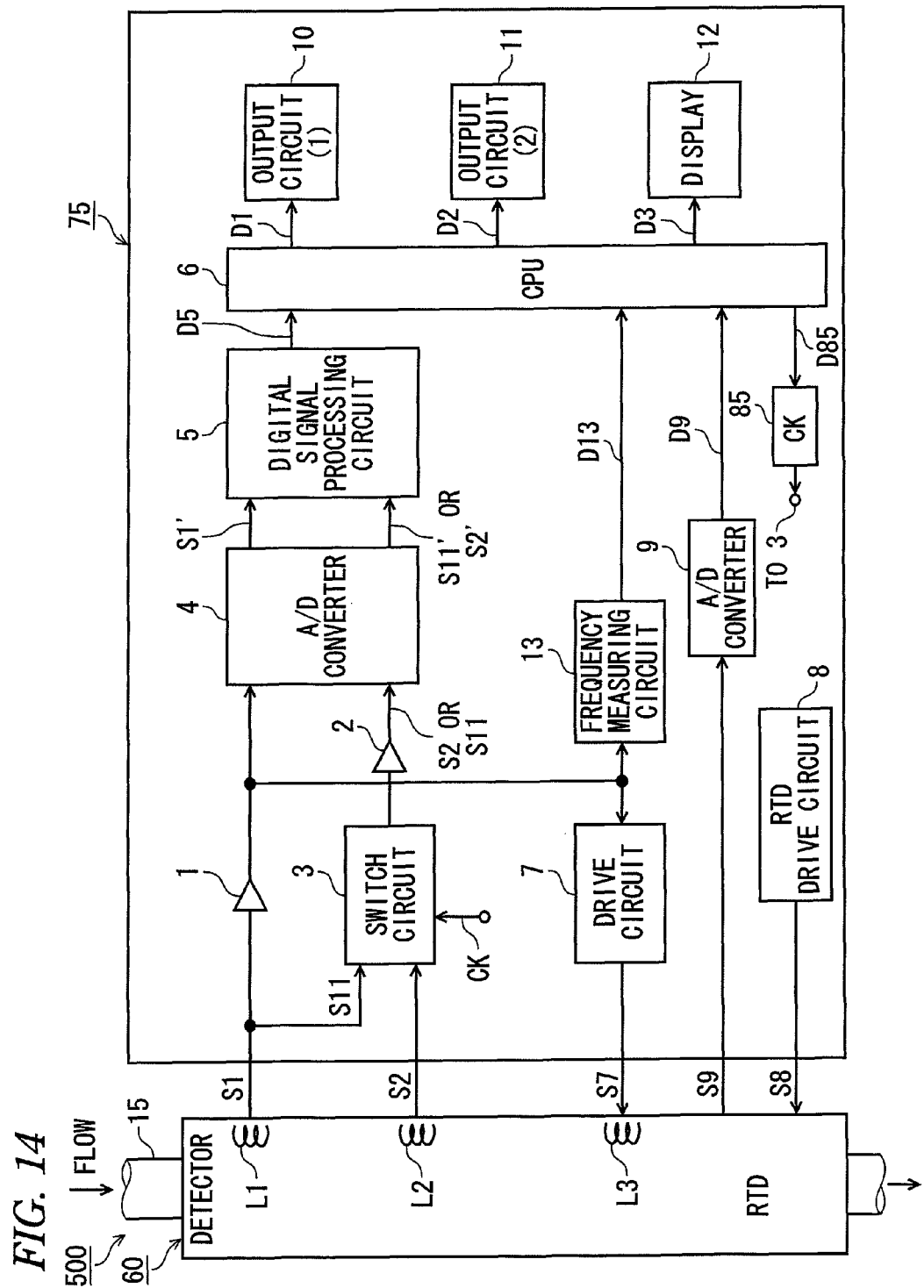
FIG. 14 is a block diagram showing an internal configuration example of the Coriolis mass flowmeter 500.
Figure 15:
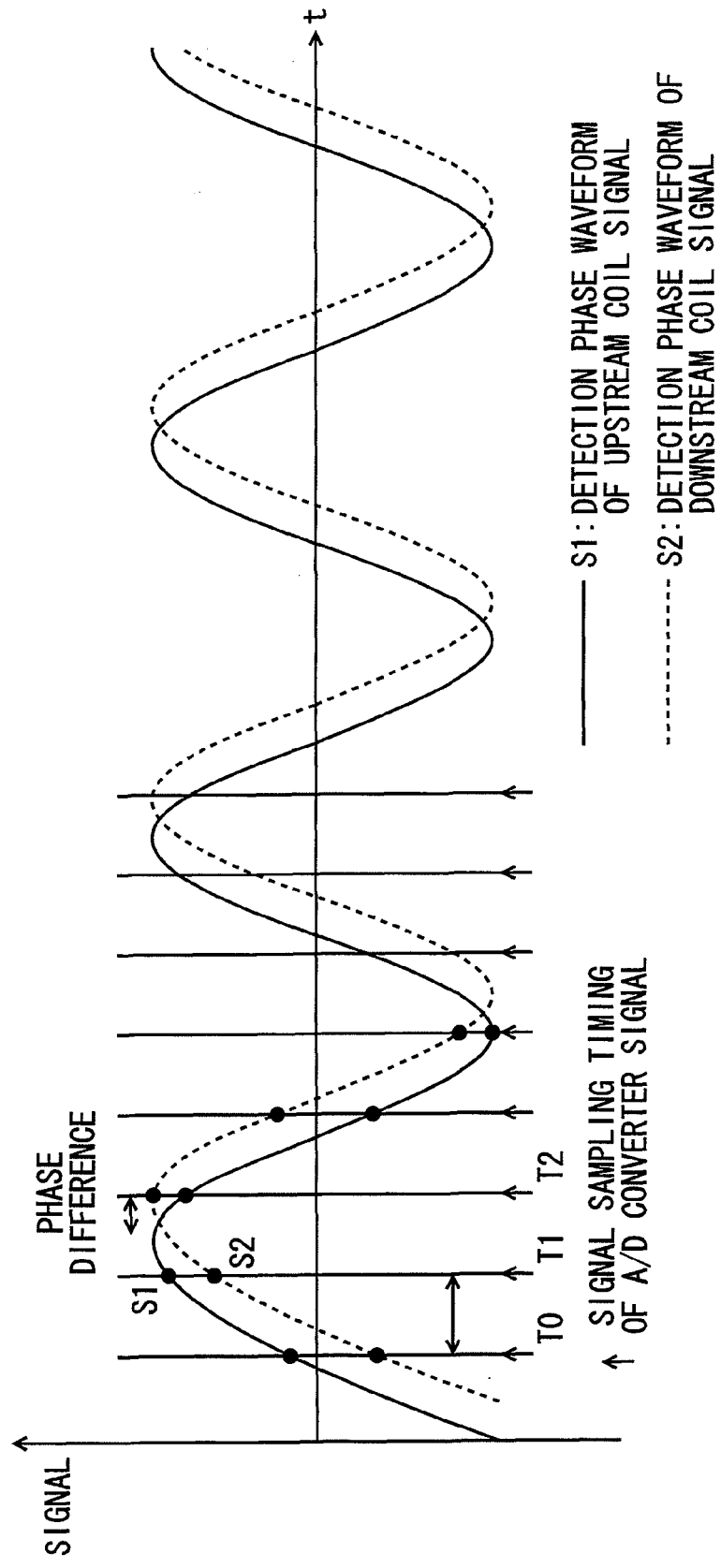
FIG. 15 is a waveform chart showing a phase detection example between an upstream coil signal S1 and a downstream coil signal S2.

The downstream coil L2 is provided in the downstream sensor 63 shown in FIG. 12, detects downstream vibration of the tube 15, and outputs a downstream coil signal S2 as an example of a vibration signal to the converter 71. The drive coil L3 is provided in the exciter 61 shown in FIG. 12, is driven by a vibration control signal supplied from the converter 71, and drives the tube 15 in a predetermined vibration mode.

The resistance temperature detector RTD is provided in the temperature sensor 64 shown in FIG. 12. The temperature sensor 64 is driven by a resistance drive signal S8 output from the converter 71. The temperature sensor 64 detects the temperature of a fluid flowing through the tube 15 (precisely, surface temperature of the tube 15 to which the temperature sensor 64 is attached) and outputs a temperature detection signal S9 to the converter 71. The temperature detection signal S9 is used to prevent a measurement error of a mass flow rate caused by temperature fluctuation of the fluid.

The converter 71 is connected to the upstream coil L1, the downstream coil L2, the drive coil L3, and the resistance temperature detector RTD. The converter 71 includes input amplifiers 1, 2, 21, and 22, a CPU 6, a drive circuit 7, an RTD drive circuit 8, A/D converters 9 and 40, output circuits 10 and 11, a display 12, a frequency measuring circuit 13, switch circuits 23 and 24, a digital signal processing circuit 50, and a timing signal generator 81.

The input amplifier 1 is connected to the upstream coil L1, amplifies the upstream coil signal S1, and outputs the amplified upstream coil signal S1 to the A/D converter 40. The input amplifier 2 is connected to the downstream coil L2, amplifies the downstream coil signal S2, and outputs the amplified downstream coil signal S2 to the A/D converter 40. It is desirable that the input signals should be completely synchronized with each other and be sampled in the A/D converter 40; to loosen the restriction, the switch circuits 23 and 24 are provided and switch control is executed.

In the example, in the figure, the portion surrounded by an alternate long and short dash line forms path #1 and the portion surrounded by a dotted line forms path #2. A branch point a is provided in the path #1, a transmission path is branched into three parts at the branch point a, and the three parts are connected to the input amplifier 1 and the switch circuits 23 and 24. A branch point b is provided in the path #2, a transmission path is branched into three parts at the branch point b, and the three parts are connected to the input amplifier 2 and the switch circuits 23 and 24. In the example, upstream coil signals S101 and S102 are branched from the upstream coil signal S1 at the branch point a, and downstream coil signals S201 and S202 are branched from the downstream coil signal S2 at the branch point b.

Thus, the upstream coil signals S101 and S102 branch from the same upstream coil signal S1 and the downstream coil signals S201 and S202 branch from the same downstream coil signal S2. However, it is conceivable that the signals will receive different effects and contain different phase shifts (zero compensation value components) in each branch path until the signals are converted into digital signals in the A/D converter.

The phase difference between upstream coil signals S1' and S201' corresponding to a first flow rate signal contains a phase shift component (first zero compensation value component) occurring in the path #1 from the branch point a to the digital signal processing circuit 50. The first zero compensation value component compensates for from the phase difference component between the upstream coil signal S1' and an upstream coil signal S101'.

The phase difference between downstream coil signals S2' and S102' corresponding to a second flow rate signal contains a phase shift component (second zero compensation value component) occurring in the path #2 from the branch point b to the digital signal processing circuit 50. The second zero compensation value component compensates for from the phase difference component between the downstream coil signal S2' and a downstream coil signal S201'. The compensation makes it possible to execute flow rate measurement with a small error component.

Figure 2:
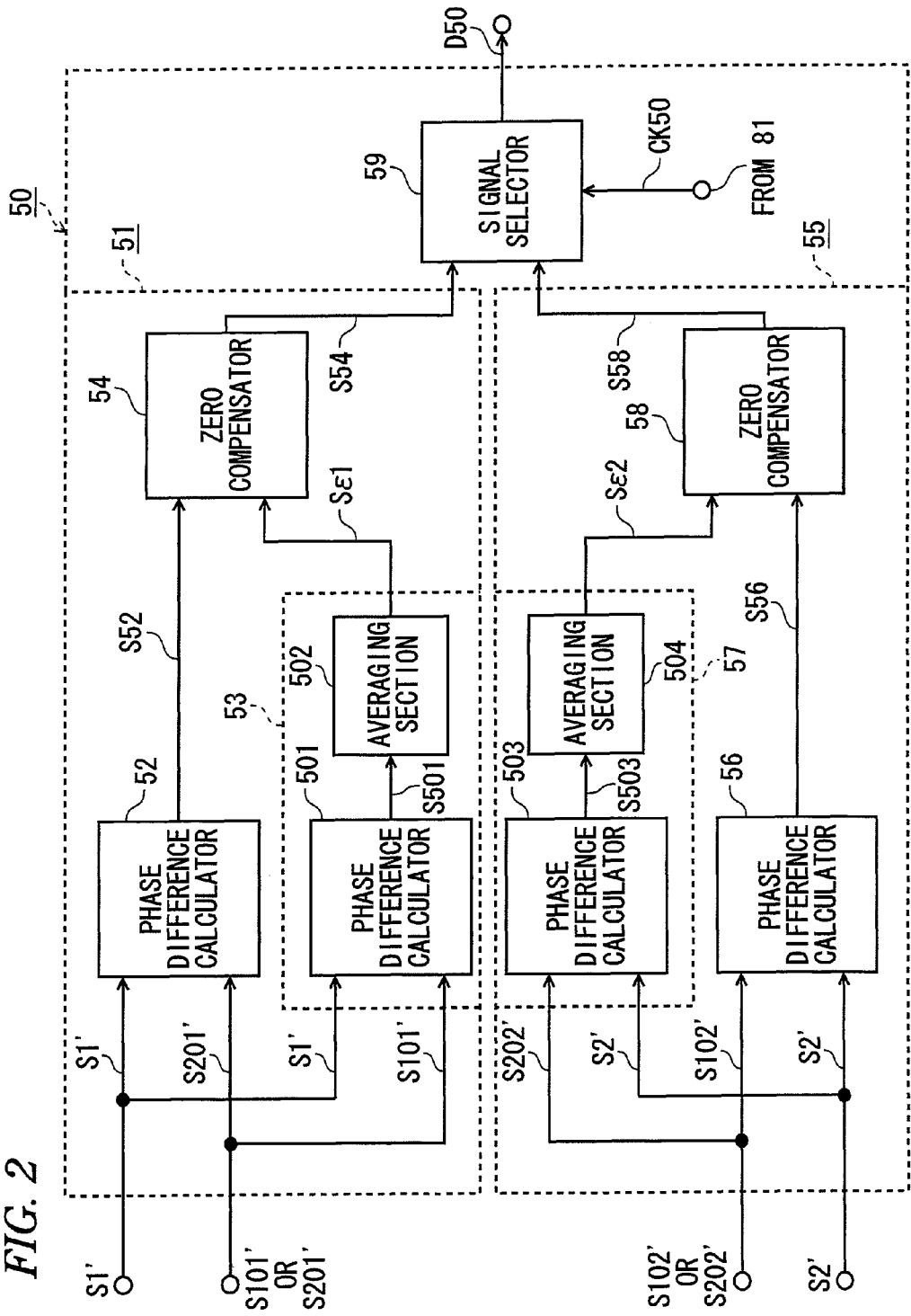
FIG. 2 is a block diagram showing an internal configuration example of a digital signal processing circuit 50.

Based on this, the switch circuit 23 switches either the upstream coil signal S101 or the downstream coil signal S201 in a time division manner based on a clock signal CK1 so that a digital signal after conversion can be input to the digital signal processing circuit 50 (the signal processor 51 shown in FIG. 2). Likewise, the switch circuit 24 switches either the downstream coil signal S202 or the upstream coil signal S102 in a time division manner based on a clock signal CK2 so that a digital signal after conversion can be input to the digital signal processing circuit 50 (the signal processor 55 shown in FIG. 2) (switch control).

In the example, the input amplifier 21 is connected to the switch circuit 23 and the input amplifier 22 is connected to the switch circuit 24. For example, the switch circuit 23 switches input of the input amplifier 21 to the path #1 or the path #2 in a time division manner based on the clock signal CK1, selects the upstream coil signal S101 or the downstream coil signal S201, and outputs the signal to the input amplifier 21. The clock signal CK1 is supplied from the timing signal generator 81 to the switch circuit 23.

The switch circuit 24 switches input of the input amplifier 22 to the path #1 or the path #2 in a time division manner based on the clock signal CK2, selects the upstream coil signal S102 or the downstream coil signal S202, and outputs the signal to the input amplifier 22. The clock signal CK2 is supplied from the timing signal generator 81 to the switch circuit 24. Both the input amplifiers 21 and 22 are connected to the A/D converter.

The first and second zero compensation value components described above also contain a shift of the sampling timing of each input signal occurring in the A/D converter 40. However, switch control of the switch circuits 23 and 24 is executed, thereby eliminating the need for sampling and holding the phases of the upstream coil signals S1', S101', and S102' and the downstream coil signals S2', S201', and S202' at the same timing.

The A/D converter 40 converts the analog upstream coil signal S1 output from the input amplifier 1 into a digital signal and outputs the digital upstream coil signal S to the digital signal processing circuit 50. The A/D converter 40 converts the analog upstream coil signal S101 or the analog downstream coil signal S201 output in a time division manner from the input amplifier 21 into a digital signal and outputs the digital upstream coil signal S101' or the digital downstream coil signal S201' to the digital signal processing circuit 50.

The A/D converter 40 converts the analog upstream coil signal S102 or the analog downstream coil signal S202 output in a time division manner from the input amplifier 22 into a digital signal and outputs the digital upstream coil signal S102' or the digital downstream coil signal S202' to the digital signal processing circuit 50. The A/D converter 40 converts the analog downstream coil signal S2 output from the input amplifier 2 into a digital signal and outputs the digital downstream coil signal S2' to the digital signal processing circuit 50.

The digital signal processing circuit 50 forming an example of a flow rate signal calculator is connected to the A/D converter. The digital signal processing circuit 50 measures the upstream coil signal S1 and the downstream coil signal S2 containing the phase difference between upstream vibration and downstream vibration of the tube 15 in a time division manner, calculates the phase difference between flow rate signals S52 and S56 indicating the mass flow rate of a fluid and corresponding to the phase difference between the vibrations from the upstream coil signals S1, S101, and S102 and the downstream coil signals S2, S201, and S202 provided by measuring the signals, and continuously outputs flow rate data D50 indicating the mass flow rate of the fluid. An internal configuration example will be discussed with FIG. 2.

The CPU 6 is connected to the digital signal processing circuit 50. The A/D converter 9, the frequency measuring circuit 13, and the timing signal generator 81 are connected to the CPU 6. The A/D converter 9 is connected to the resistance temperature detector RTD. The RTD drive circuit 8 is connected to the resistance temperature detector RTD.

The RTD drive circuit 8 supplies the resistance drive signal S8 for setting an operation current for the resistance temperature detector RTD when the temperature of a fluid is measured. The resistance temperature detector RTD drives based on the resistance drive signal S8 and generates the temperature detection signal S9 when detecting the temperature (Te) of a fluid. The A/D converter 9 inputs the temperature detection signal S9, converts the analog signal into a digital signal, and outputs digital temperature detection data D9 to the CPU 6.

On the other hand, the frequency measuring circuit 13 is connected to the input amplifier 1 and the drive circuit 7. The drive circuit 7 generates a vibration control signal S7 from the upstream coil signal S1 output from the upstream sensor 62 to excite the tube 15, and outputs the signal to the drive coil L3. The drive coil L3 excites the tube 15 based on the vibration control signal S7 and vibrates the tube 15 at its unique oscillation frequency f0. The drive circuit 7 may generate the vibration control signal S7 based on the downstream coil signal S2 output from the downstream sensor 63. The frequency measuring circuit 13 inputs the upstream coil signal S1, measures frequency, and outputs frequency data D13 of a flow rate signal dependent on the unique oscillation frequency f0 of a fluid to the CPU 6.

The CPU 6 computes a density signal D according to expression (1) using the frequency data D13 (oscillation frequency f0) output from the frequency measuring circuit 13 and the temperature detection data D9 (temperature Te) output from the A/D converter 9.

$$D = K1(f0^2 - fv^2)/fv^2 \quad (1)$$

where the frequency fv in expression (1) is represented by expression (2).

$$fv = f0 + K2 \cdot Te \quad (2)$$

Variables K1 and K2 in expressions (1) and (2) are predetermined constants.

The CPU 6 computes mass flow rate Q using expression (3).

$$Q = f(Te) \cdot f(D) \cdot \tan \phi'/f0 \quad (3)$$

In expression (3), f (Te) is a correction term of temperature and f (D) is a correction term of density.

The output circuit 10 outputs flow rate output data D1 indicating the flow rate of a fluid based on the mass flow rate Q computed by the CPU 6 to the output. The output circuit 11 outputs flow rate output data D2 indicating the flow rate of a fluid based on the mass flow rate Q computed by the CPU 6 to the output. The flow rate output data D1 is output from the CPU 6 to the output circuit 10. The flow rate output data D2 is output from the CPU 6 to the output circuit 11. The display 12 displays the flow rate, the mass, the temperature, etc., of the fluid based on display data D3. The display data D3 is data to display the flow rate, the mass, the temperature, etc., of the fluid based on the mass flow rate Q computed by the CPU 6 and is output from the CPU 6 to the display 12.

The timing signal generator 81 inputs control data D81 from the CPU 6 and generates clock signals CK1, CK2, and CK50 for signal switch based on the control data D81. The clock signal CK1 is output from the timing signal generator 81 to the switch circuit 23. The clock signal CK2 is output from the timing signal generator 81 to the switch circuit 24. The clock signal CK50 is output from the timing signal generator 81 to the digital signal processing circuit 50.

When the converter 71 is thus configured, the fluctuation factor of flow rate measurement caused by a change in an environmental condition of the signal path from input of the upstream coil signal S1 to output of the upstream coil signal S1', 101', 201' in the path #1, signal path from input of the downstream coil signal S2 to output of the downstream coil signal S2', 102', 202' in the path #2, etc.

Subsequently, an internal configuration example of the digital signal processing circuit 50 will be discussed with reference to FIG. 2. In this example, the digital signal processing circuit 50 calculates a zero compensation value Sϵ1 as an example of a first correction value, a zero compensation value Sϵ2 as an example of a second correction value, etc., to correct the flow rate signal S52, S56, etc., using one or more of the upstream coil signal S1 and the downstream coil signal S2 output from the detection circuit 60 and a reference signal output from a predetermined reference signal generation circuit. The digital signal processing circuit 50 shown in FIG. 2 includes a first signal processor 51, a second signal processor 55, and a signal selector 59.

The signal processor 51 is connected to an output stage of the A/D converter 40 shown in FIG. 1, calculates the difference between the upstream coil signal S1' and the downstream coil signal S201' output from the A/D converter 40, outputs the first flow rate signal S52, calculates the difference between the upstream coil signal S1' output from the A/D converter 40 and the upstream coil signal S101' flowing through the signal path from input of the flow rate signal S52 to output, generates the zero compensation value Set, and corrects the flow rate signal S52 with the zero compensation value Set. When the signal processor 55 detects the second flow rate signal S56, the signal processor 51 generates the zero compensation value Sϵ1.

The signal processor 51 includes a phase difference calculator 52, a zero compensation value generator 53, and a zero compensator 54, for example. The phase difference calculator 52 forms an example of a first calculator, calculates the difference between the upstream coil signal S1' and the down coil signal S201' output from the A/D converter, and outputs the flow rate signal S52. For the phase difference calculator 52, for example, a system using FFT/DFT, a system using a 90-degree phase conversion filter, a system using demodulation processing, etc., can be conceived; any method may be used.

The zero compensation value generator 53 calculates the difference between the upstream coil signal S1' output from the A/D converter 40 and the upstream coil signal S101' flowing through the signal path to the phase difference calculator 52 and generates the zero compensation value Sϵ1. In the example, when the phase difference calculator 56 detects the flow rate signal S56, the zero compensation value generator 53 generates the zero compensation value Sϵ1.

The zero compensation value generator 53 includes a phase difference calculator 501 and an averaging section 502, for example. The phase difference calculator 501 calculates the difference between the upstream coil signal S1' output from the A/D converter 40 and the upstream coil signal S101' flowing through the signal path to the phase difference calculator 52. The averaging section 502 is connected to the phase difference calculator 501. The averaging section 502 averages a difference output signal S501 of the phase difference calculator 501 and generates the zero compensation value S∈1.

The zero compensator 54 for forming an example of a first correction section is connected to the phase difference calculator 52 and the averaging section 502. The zero compensator 54 corrects the flow rate signal S52 with the zero compensation value S∈1. A subtractor is used for the zero compensator 54; for example, the zero compensator 54 subtracts the zero compensation value S∈1 from the flow rate signal S52.

The signal processor 55 is connected to the output stage of the A/D converter 40, calculates the difference between the downstream coil signal S2' and the upstream coil signal S102' output from the A/D converter 40, outputs the flow rate signal S56, calculates the difference between the downstream coil signal S2' output from the A/D converter 40 and the downstream coil signal S202' flowing through the signal path to detection of the flow rate signal S56, generates a second zero compensation value S∈2, and corrects the flow rate signal S56 with the second zero compensation value S∈2. In the example, when the signal processor 51 detects the flow rate signal S52, the signal processor 55 generates the zero compensation value S∈2.

The signal processor 55 includes a phase difference calculator 56, a zero compensation value generator 57, and a zero compensator 58, for example. The phase difference calculator 56 forms an example of a second calculator, calculates the difference between the downstream coil signal S2 and the upstream coil signal S102' output from the A/D converter 40, and outputs the flow rate signal S56.

The zero compensation value generator 57 calculates the difference between the downstream coil signal S2' output from the A/D converter and the downstream coil signal S202' flowing through the signal path to the phase difference calculator 56 and generates the zero compensation value S∈2.

The zero compensation value generator 57 includes a phase difference calculator 503 and an averaging section 504, for example. The phase difference calculator 503 calculates the difference between the downstream coil signal output from the A/D converter and the downstream coil signal S202' flowing through the signal path to the phase difference calculator 56. The averaging section 504 is connected to the phase difference calculator 503. The averaging section 504 averages a difference output signal S503 of the phase difference calculator 503 and generates the zero compensation value S∈2.

The zero compensator 58 to form an example of the second correction section to form an example of a second correction section is connected to the phase difference calculator 56 and the averaging section 58 described above. The zero compensator 58 corrects the flow rate signal S56 with the zero compensation value S∈2. A subtractor is also used for the zero compensator 58 and the zero compensation value S∈2 is subtracted from the flow rate signal S56.

The signal selector 59 to form an example of a selector is connected to the zero compensators 54 and 58. The signal selector 59 alternately selects a corrected flow rate signal S54 output from the zero compensator 54 of the signal processor 51 and a corrected flow rate signal S58 output from the zero compensator 58 of the signal processor 55 based on the clock signal CK50 and continuously outputs the flow rate data D50 to the CPU 6.

When the digital signal processing circuit 50 is thus configured, zero point compensation processing can be executed without interrupting flow rate measurement, so that the flow rate measurement interrupt time becomes zero and the frequency of the zero point compensation measurement can be increased. Thus, the number of samples of zero point signal compensation value (average value) can be sufficiently ensured and the error component contained in the zero point signal compensation value can be decreased. Accordingly, the Coriolis mass flowmeter 100 having stable stability can be provided.

Subsequently, an operation example of the converter 71 of the Coriolis mass flowmeter 100 will be discussed with reference to FIGS. 3A to 3C and FIGS. 4A to 4D. FIG. 4A is a time chart showing a flow rate measurement example in the path #1, FIG. 4B is a time chart showing a zero compensation value measurement example in the path #1, FIG. 4C is a time chart showing a flow rate measurement example in the path #2, and FIG. 4D is a time chart showing a zero compensation value measurement example in the path #2. The horizontal axes of FIGS. 4A to 4D indicate time t.

In the embodiment, to obtain the flow rate data D50 to find the mass flow rate Q of a fluid, two types of basic processing are repeated and the phase difference corresponding to the flow rate signal compensating for the zero point error component is measured. In the first processing, the signal processor 51 measures the phase difference between the upstream coil signal S1' and the downstream coil signal S201' corresponding to the first flow rate signal S52 in the path #1 and finds the net phase difference of the flow rate signal S52 using the first zero compensation value calculated in the path #1. Concurrently with the operation, the phase signal processor 55 measures the phase difference between the downstream coil signal S2' and the downstream coil signal 202' (second zero compensation value component) in path #2.

In the second processing, after a lapse of any time period, the signal processor 55 measures the phase difference between the downstream coil signal S2' and the upstream coil signal S102' corresponding to the second flow rate signal S56 in the path #2 and finds the net phase difference of the flow rate signal S56 using the second zero compensation value calculated in the path #2. Concurrently with the operation, the phase signal processor 51 measures the phase difference between the upstream coil signal S101' and the upstream coil signal 101' (first zero compensation value component) in path #1. In the first repetition, the zero compensation value S∈1 in the path #1 becomes an undefined value and thus may be initialized with any value. In the example, in initialization, the switch circuit 23 selects the upstream coil signal S101 and the switch circuit 24 selects the downstream coil signal S102.

Figure 3A:
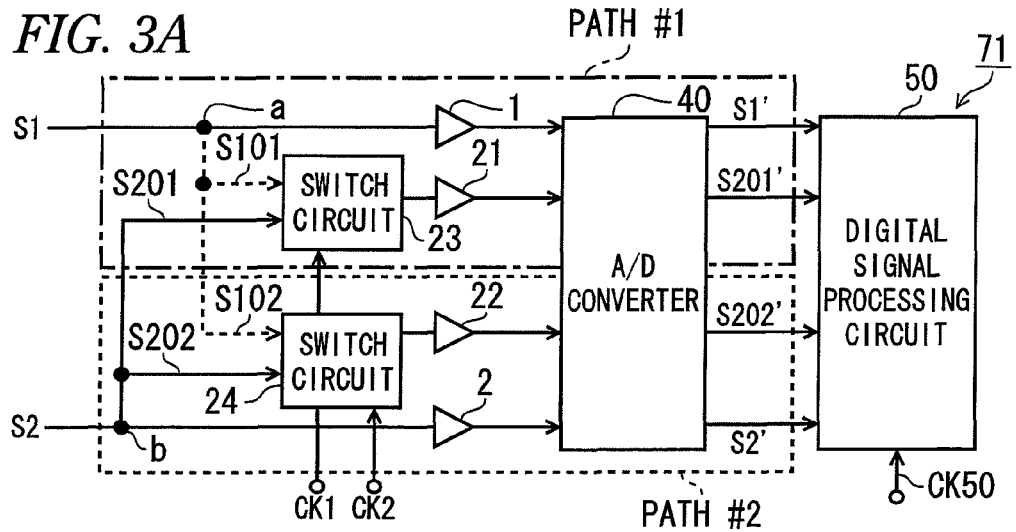
FIGS. 3A to 3C are configuration drawings showing an operation example (No. 1) of a converter 71.

With this as an operation condition, according to the operation example of the converter 71 shown in FIG. 3A, to execute the first processing described above, the upstream coil signal S1 output from the detector 60 shown in FIG. 1 is input to the A/D converter 40 through the input amplifier 21. The switch circuit 23 switches connection from the upstream coil signal S101 of initialization to the downstream coil signal S201 based on the clock signal CK1 shown in FIG. 1 so as to output the downstream coil signal S201 from the branch point b to the A/D converter 40 through the input amplifier 21.

The switch circuit 24 switches connection from the upstream coil signal S102 of initialization to the downstream coil signal S202 based on the clock signal CK2 shown in FIG. 1 so as to output the downstream coil signal S202 from the branch point b to the A/D converter 40 through the input amplifier 22. The downstream coil signal S2 is input to the A/D converter 40 through the input amplifier 2.

The A/D converter 40 converts the analog amplified upstream coil S1 and downstream coil signal S201 into digital signals and outputs the digital upstream coil signal S1' and the digital downstream coil signal S201' to the digital signal processing circuit 50. The A/D converter 40 converts the analog amplified upstream coil S2 and downstream coil signal S202 into digital signals and outputs the digital upstream coil signal S2' and the digital downstream coil signal S202' to the digital signal processing circuit 50.

In the digital signal processing circuit 50, the signal processor 51 shown in FIG. 2 calculates the difference between the upstream coil signal S1 and the downstream coil signal S201' and outputs the first flow rate signal S52 in a first time period (1) shown in FIG. 4A. The flow rate signal S52 is provided by calculating the difference between the upstream coil signal 1' and the downstream coil signal S201' by the phase difference calculator 52 of the signal processor 51. The flow rate signal S52 is output to the zero compensator 54.

On the other hand, the signal processor shown in FIG. 2 detects the difference between the downstream coil signal ST and the downstream coil signal S202' and generates the zero compensation value Sϵ2 in a first time period (1) shown in FIG. 4D. At this time, in the zero compensation value generator 57, when the phase difference calculator 503 calculates the difference between the downstream coil signal S2' and the downstream coil signal S202', the averaging section 504 averages the difference output signal S503 of the phase difference calculator 503 and generates the zero compensation value Sϵ2. The zero compensation value Sϵ2 is output to the zero compensator 58.

Accordingly, the phase difference between the upstream coil signal S1' and the downstream coil signal 201' corresponding to the flow rate signal S52 in the path #1 can be measured, the net phase difference of the flow rate signal S52 can be found using the first zero compensation value Sϵ1 calculated early in the path #1, and concurrently with the processing, the phase difference between the downstream coil signal S2' and the downstream coil signal 202' (second zero compensation value component) can be measured in the path #2.

Figure 3B:
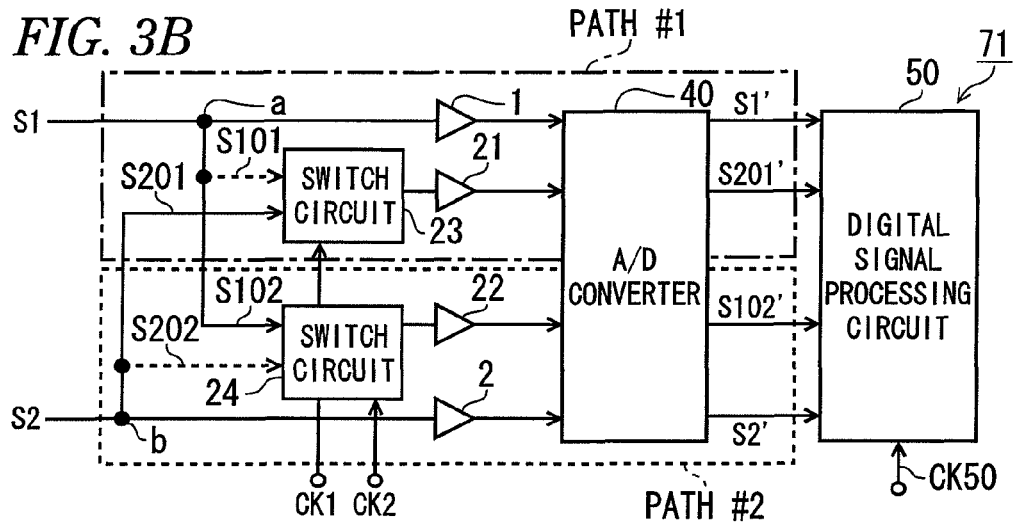

According to an operation example of the converter 71 shown in FIG. 3B, when a transition is made from the first processing to the second processing, the upstream coil signal S1 output from the detector 60 shown in FIG. 1 remains input to the A/D converter 40 through the input amplifier. The switch circuit 23 maintains a state in which the downstream coil signal 201 from the branch point b is output to the A/D converter through the input amplifier in the first time period (2) shown in FIG. 4A. The time period (2) is the time until the data held in the A/D converter 40, the data used for filtering, etc., is switched by the switch circuits 23 and 24 and is replaced with the post-switched data. The time period (2) may be set as desired. In the example, the switch circuit 23 shown in FIG. 3B maintains switch connection from the upstream coil signal S101 to the downstream coil signal S201.

In contrast, the switch circuit 24 switches connection from the downstream coil signal S202 to the upstream coil signal 102 so as to output the upstream coil signal 102 from the branch point a to the A/D converter 40 through the input amplifier 22. The upstream coil signal 102 is input to the A/D converter 40 through the input amplifier 22.

The A/D converter 40 converts the analog amplified upstream coil signal and downstream coil signal S201 into digital signals and outputs the digital upstream coil signal S1' and the digital downstream coil signal S201' to the digital signal processing circuit 50.

In the digital signal processing circuit 50, the signal processor 51 shown in FIG. 2 calculates the difference between the upstream coil signal S1' and the downstream coil signal S201' and continues flow rate measurement in the time period (2) shown in FIG. 4A and continuously outputs the first flow signal S52 by the time period (2) shown in FIG. 4A. After waiting for switch of the switch circuit 24, the signal processor 51 calculates the difference between the upstream coil signal S1' and the upstream coil signal 101' and generates the zero compensation value Sϵ1 in the time period (3) shown in FIG. 4B. The signal processor 51 corrects the flow rate signal S2 in the second time period (1) shown in FIG. 4A with the zero compensation value Sϵ1.

The signal processor 55 shown in FIG. 2 waits for switch of the switch circuit 24 in the time period (2) shown in FIG. 4C and then starts to calculate the difference between the upstream coil signal S102' and the downstream coil signal S2' in the time period (3) shown in FIG. 4C and starts to output the second flow rate signal S56. On the other hand, the signal processor 51 shown in FIG. 2 waits for switch of the switch circuit 24 in the time period (3) shown in FIG. 4B and then starts to calculate the difference between the upstream coil signal S1' and the upstream coil signal S101' in the time period (3) shown in FIG. 4B and starts to generate the first zero compensation value.

Accordingly, the phase difference measurement between the upstream coil signal S1' and the downstream coil signal 201' corresponding to the flow rate signal S52 in the path #1 is continued and concurrently with this processing, a transition can be made from generation of the second zero compensation value Sϵ2 to phase difference measurement between the downstream coil signal S2' and the upstream coil signal S102' corresponding to the second flow rate signal S56 and generation of the first zero compensation value Sϵ1 can be started without producing a discontinuous portion in the path #2.

Figure 3C:
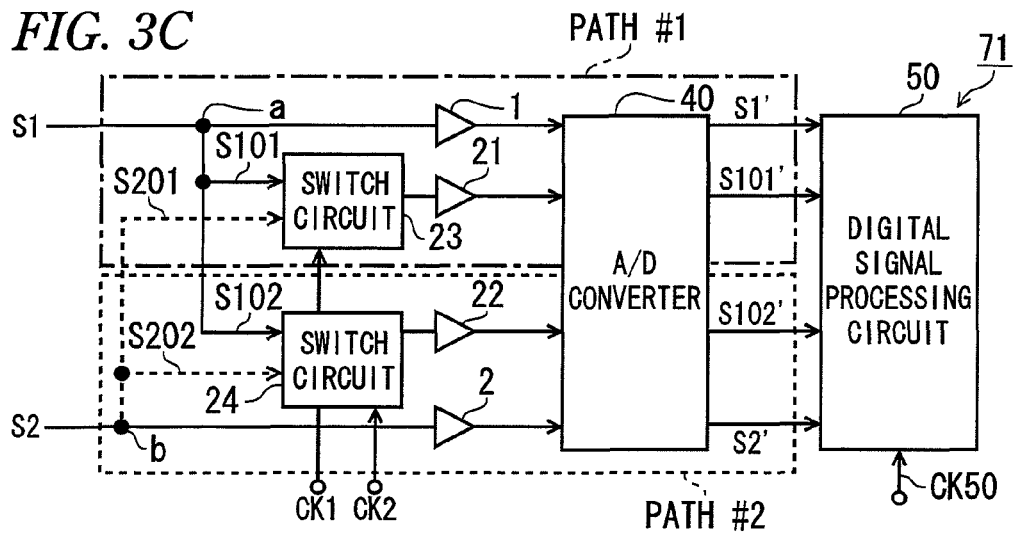

According to the operation example of the converter 71 shown in FIG. 3C, to execute the second processing described above, the upstream coil signal S1 output from the detector 60 shown in FIG. 1 is input to the A/D converter 40 through the input amplifier 1.

The switch circuit 23 outputs the upstream coil signal S101 from the branch point a to the A/D converter 40 through the input amplifier 21 in the time period (3) shown in FIG. 4C. Thus, the switch circuit 23 shown in FIG. 3C switches connection from the downstream coil signal S201 to the upstream coil signal S101. In contrast, the switch circuit 24 maintains a state in which the upstream coil signal S102 from the branch point a is output to the A/D converter 40 through the input amplifier 22. Thus, the switch circuit 24 shown in FIG. 3C maintains switch connection from the downstream coil signal 202 to the upstream coil signal 102 as it is.

The A/D converter 40 converts the analog amplified upstream coil signal S1 and the analog amplified upstream coil signal S101 into digital signals and outputs the digital upstream coil signal S1' and the digital upstream coil signal S101' to the digital signal processing circuit 50. The A/D converter 40 converts the analog amplified upstream coil signal S102 and the analog amplified downstream coil signal S2 into digital signals and outputs the digital upstream coil signal S102' and the digital downstream coil signal S2' to the digital signal processing circuit 50.

In the digital signal processing circuit 50, the signal processing circuit 55 shown in FIG. 2 calculates the difference between the downstream coil signal S2' and the upstream coil signal S102' in the first time period (3) shown in FIG. 4C and outputs the second flow rate signal S56. The flow rate signal S56 is provided by calculating the difference between the downstream coil signal S2' and the upstream coil signal S102' by the phase difference calculator 56 of the signal processor 55. The flow rate signal S56 is output to the zero compensator 58. The zero compensator 58 subtracts the zero compensation value Sϵ2 from the flow rate signal S56. Accordingly, it is made possible to correct the flow rate signal S56 with the zero compensation value Sϵ2.

On the other hand, in the signal processor 51 shown in FIG. 2, the difference between the upstream coil signal S1' and the upstream coil signal S101' is detected and the zero compensation value Sϵ1 is generated. At this time, in the zero compensation value generator 53, when the phase difference calculator 501 calculates the difference between the upstream coil signal S1' and the upstream coil signal S101', the averaging section 502 averages the difference output signal S501 of the phase difference calculator 501 and generates the zero compensation value Sϵ1. The zero compensation value Sϵ1 is output to the zero compensator 54 and is used to correct the first flow rate signal S52 in the second time period (1) shown in FIG. 4A. At this time, the zero compensator 54 subtracts the zero compensation value Sϵ1 from the flow rate signal S52.

Likewise, the zero compensation value Sϵ2 obtained in the time period (1) shown in FIG. 4D is used to correct the second flow rate signal S56 in the second time period (3) shown in FIG. 4B. The flow rate signal S52 output from the zero compensator 54 and the flow rate signal S56 output from the zero compensator 58 are input to the signal selector 59. The signal selector 59 alternately selects the post-corrected flow rate signal S54 and the post-corrected flow rate signal S56 based on the clock signal CK50 and outputs the signal continuously as the flow rate data D50 to the CPU 6.

Accordingly, the phase difference between the downstream coil signal S2' and the upstream coil signal S102' corresponding to the flow rate signal S56 is measured in the path #2 and the net phase difference of the flow rate signal S56 can be found using the second zero compensation value S62 previously calculated in the path #2 and concurrently with the processing, the phase difference between the upstream coil signal S1' and the upstream coil signal S101' (first zero compensation value component) can be measured in the path #1.

Table 1 lists combinations of the upstream coil signals S1', S101', and S102' and the downstream coil signals S2', S201', and S202' transmitted through the path #1 and the path #2.

TABLE 1

| Time period No. | Path #1 | | Path #2 | |
|---|---|---|---|---|
| | Signal 1 | Signal 2 | Signal 1 | Signal 2 |
| (1) | Upstream coil signal S1' | Downstream coil signal S201' | Downstream coil signal S202' | Downstream coil signal S2' |
| (2) | Upstream coil signal S1' | Downstream coil signal S201' | Upstream coil signal S102' | Downstream coil signal S2' |
| (3) | Upstream coil signal S1' | Downstream coil signal S101' | Upstream coil signal S102' | Downstream coil signal S2' |

According to Table 1, signal 1 transmitted through the path #1 in the time period (1) is the upstream coil signal S1' and signal 2 is the downstream coil signal S201'. Signal 1 transmitted through the path #2 is the downstream coil signal S202' and signal 2 is the downstream coil signal S2'.

Signal 1 transmitted through the path #1 in the time period (2) is the upstream coil signal S1' and signal 2 is the downstream coil signal S201'. Signal 1 transmitted through the path #2 is the upstream coil signal S102' and signal 2 is the downstream coil signal S2'.

Signal 1 transmitted through the path #1 in the time period (3) is the upstream coil signal S1' and signal 2 is the upstream coil signal S101'. Signal 1 transmitted through the path #2 is the upstream coil signal S102' and signal 2 is the downstream coil signal S2'.

Thus, the Coriolis mass flowmeter 100 according to the first embodiment includes the digital signal processing circuit 50 which has signal processors 51 and 55 to measure the mass flow rate Q of a fluid flowing through the tube 15, inputs the upstream coil signals S1', S101', and S102' and the downstream coil signals S2', S201', and S202' output from the A/D converter 40 in a time division manner, and calculates the first flow rate signal S52 indicating the input mass flow rate Q of the fluid and corresponding to the phase difference between the upstream coil signal S1' and the downstream coil signal S201' and the second flow rate signal S56 corresponding to the phase difference between the downstream coil signal S2' and the upstream coil signal S102'. When the signal processor 55 detects the flow rate signal S56, the signal processor 51 generates the zero compensation value Sϵ1. When the signal processor 51 detects the flow rate signal S52, the signal processor 55 generates the zero compensation value Sϵ2.

Therefore, measurement of the phase difference of vibration corresponding to the flow rate signal S52 and measurement of the zero compensation value Sϵ2 of the zero point signal compensation value of the signal processor 55 can be executed concurrently and measurement of the phase difference of vibration corresponding to the flow rate signal S56 and measurement of the zero compensation value Sϵ1 of the zero point signal compensation value of the signal processor 51 can be executed concurrently.

In other words, flow rate measurement can also be executed without interrupting flow rate measurement in the time period over which the zero point signal compensation value is computed and it is made possible to correct the fluctuation factor of flow rate measurement caused by a change in the environmental condition of the signal path from input of the upstream coil signal S1 to output of the flow rate signal S52, the signal path from input of the downstream coil signal S2 to output of the flow rate signal S56, etc.

A sufficient number of samples of the zero point signal compensation values (average values) in the signal processor 51 and the signal processor 55 can be ensured and the error component contained in the zero point signal compensation value can be decreased. Therefore, the zero point compensation system can be improved, so that stable flow rate measurement is made possible.

Moreover, the need for an A/D converter of a two-channel synchronous sampling system for synchronizing the upstream coil signal S1 and the downstream coil signal S2 with each other, sampling, and executing analog-to-digital conversion as in the conventional example is eliminated, restriction on use elements is removed, and it is made possible to use a general-purpose A/D converter. Accordingly, it becomes easy to select components in the digital signal processing circuit 50, and the cost of the Coriolis mass flowmeter 100 can be reduced.

Second Embodiment

Subsequently, a configuration example and an operation example of a Coriolis mass flowmeter 200 as a second embodiment of the invention will be discussed with reference to FIG. 5. In the embodiment, a digital signal processing circuit 50' outputs flow rate data D502 using an upstream coil signal S1 and a downstream coil signal S2 output from a detector 60 and reference signals S301 to S304 of any frequencies output from a predetermined reference signal generation circuit 80.

Figure 5:
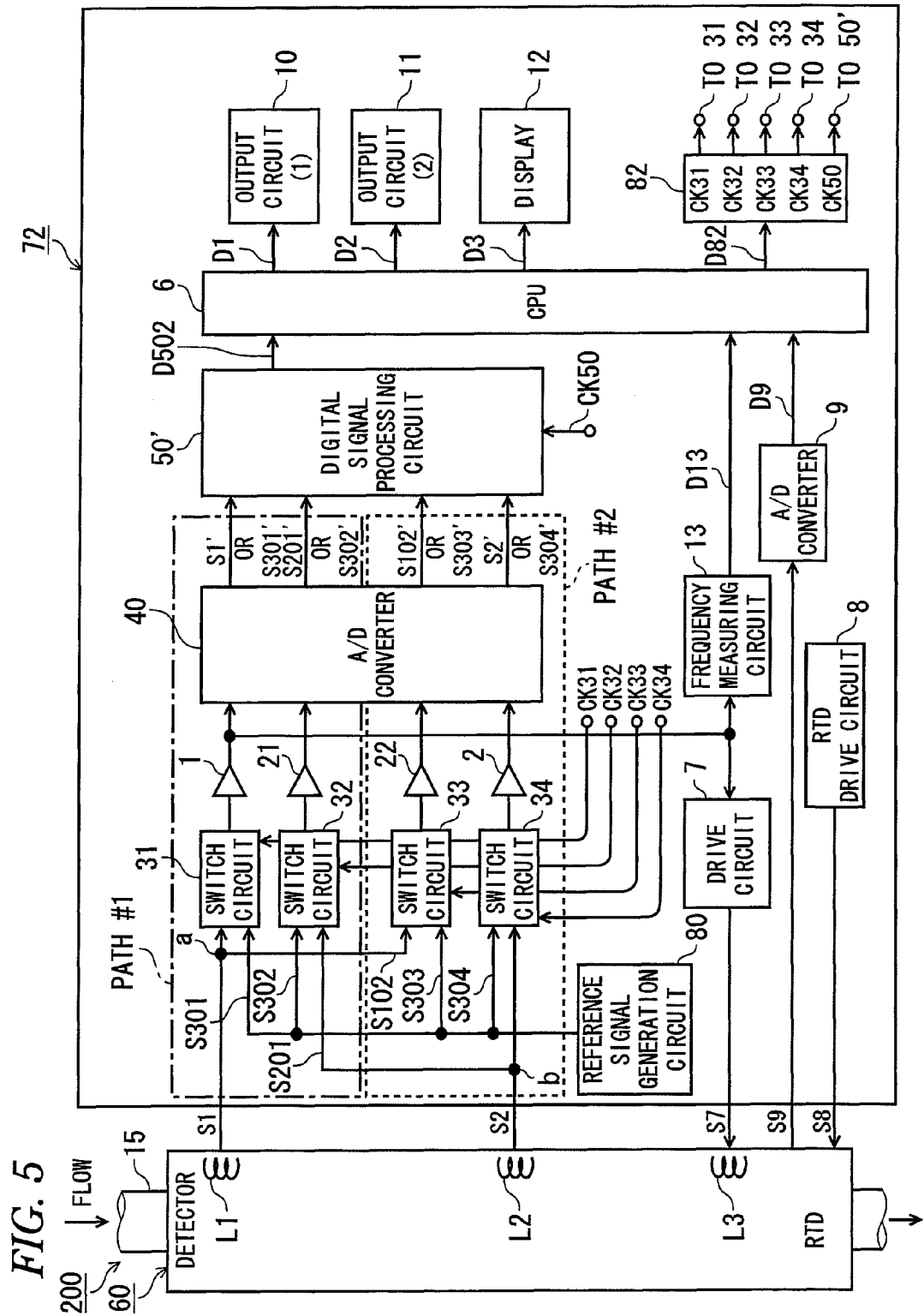
FIG. 5 is a block diagram showing a configuration example of a Coriolis mass flowmeter 200 as a second embodiment of the invention.

The Coriolis mass flowmeter 200 shown in FIG. 5 vibrates a tube 15 through which a fluid flows and measures the mass flow rate of the fluid flowing through the tube 15 from the phase difference between upstream vibration and downstream vibration of the tube 15. The Coriolis mass flowmeter 200 includes a detector 60 and a converter 72. The Detector is similar to that of the first embodiment and therefore will not be discussed again.

The converter 72 includes input amplifiers 1, 2, 21, and 22, a CPU 6, a drive circuit 7, an RTD drive circuit 8, A/D converters 9 and 40, output circuits 10 and 11, a display 12, a frequency measuring circuit 13, switch circuits 31 to 34, a digital signal processing circuit 50', a reference signal generation circuit 80, and a timing signal generator 82. Components with names and signs identical with those of the first embodiment have the same functions and therefore will not be discussed again.

The switch circuits 31 and 33 are connected to an upward coil L1 and switch circuits 32 and 34 are connected to a downward coil L2. In the figure, the portion surrounded by an alternate long and short dash line forms path #1 and the portion surrounded by a dotted line forms path #2. A branch point a is provided in the path #1, a transmission path is branched into two parts at the branch point a, and the two parts are connected to the switch circuits 31 and 33. A branch point b is provided in the path #2, a transmission path is branched into two parts at the branch point b, and the two parts are connected to the switch circuits 32 and 34. In the example, an upstream coil signal S102 is branched from the upstream coil signal S1 at the branch point a, and a downstream coil signal S201 is branched from the downstream coil signal S2 at the branch point b.

The reference signal generation circuit 80 is connected to the four switch circuits 31 to 34. In addition to the upstream coil L1, a reference signal transmission path for transmitting the reference signal S301 from the reference signal generation circuit 80 is connected to the switch circuit 31. The switch circuit 31 selects either the upstream coil signal S1 or the reference signal S301 based on a clock signal CK31 and switches the path #1 or the reference signal transmission path so as to output the upstream coil signal S1 or the reference signal S301 to the input amplifier 1. The input amplifier 1 is connected to the switch circuit 31. The input amplifier 1 amplifies the upstream coil signal S1 or the reference signal S301 and outputs the amplified upstream coil signal S1 or the amplified reference signal S301 to the A/D converter 40.

In addition to the downstream coil L2, a reference signal transmission path for transmitting the reference signal S302 from the reference signal generation circuit 80 is connected to the switch circuit 32. The switch circuit 32 selects either the downstream coil signal S201 or the reference signal S302 based on a clock signal CK32 and switches the path #2 or the reference signal transmission path so as to output the downstream coil signal S201 or the reference signal S302 to the input amplifier 21. The input amplifier 21 is connected to the switch circuit 32. The input amplifier 21 amplifies the downstream coil signal S201 or the reference signal S302 and outputs the amplified downstream coil signal S201 or the amplified reference signal S302 to the A/D converter 40.

In addition to the upstream coil L1, a reference signal transmission path for transmitting the reference signal S303 from the reference signal generation circuit 80 is connected to the switch circuit 33. The switch circuit 33 selects either the upstream coil signal S102 or the reference signal S303 based on a clock signal CK33 and switches the path #1 or the reference signal transmission path so as to output the upstream coil signal S102 or the reference signal S303 to the input amplifier 22. The input amplifier 22 is connected to the switch circuit 33. The input amplifier 22 amplifies the upstream coil signal S102 or the reference signal S303 and outputs the amplified upstream coil signal S102 or the amplified reference signal S303 to the A/D converter 40.

In addition to the downstream coil L2, a reference signal transmission path for transmitting the reference signal S304 from the reference signal generation circuit 80 is connected to the switch circuit 34. The switch circuit 34 selects either the downstream coil signal S2 or the reference signal S304 based on a clock signal CK34 and switches the path #2 or the reference signal transmission path so as to output the downstream coil signal S2 or the reference signal S304 to the input amplifier 2. The input amplifier 2 is connected to the switch circuit 34. The input amplifier 2 amplifies the downstream coil signal S2 or the reference signal S304 and outputs the amplified downstream coil signal S2 or the amplified reference signal S304 to the A/D converter 40.

The A/D converter 40 converts the analog upstream coil signal S1 or the analog reference signal S301 output in a time division manner from the input amplifier 1 into a digital signal and outputs the digital upstream coil signal S1' or the digital reference signal S301' to the digital signal processing circuit 50'. The A/D converter 40 converts the analog downstream coil signal S201 or the analog reference signal S302 output in a time division manner from the input amplifier 21 into a digital signal and outputs the digital upstream coil signal S201' or the digital reference signal S302' to the digital signal processing circuit 50'.

The A/D converter 40 converts the analog upstream coil signal S102 or the analog reference signal S303 output in a time division manner from the input amplifier 22 into a digital signal and outputs the digital upstream coil signal S102' or the digital reference signal S303' to the digital signal processing circuit 50'. The A/D converter 40 converts the analog downstream coil signal S2 or the analog reference signal S304 output from the input amplifier 2 into a digital signal and outputs the digital downstream coil signal S2' or the digital reference signal S304' to the digital signal processing circuit 50'.

The digital signal processing circuit 50' forms another example of flow rate signal calculator and is connected to the A/D converter 40. The digital signal processing circuit 50' calculates the phase difference between flow rate signals S52 and S56 indicating the mass flow rate of a fluid and corresponding to the vibration phase difference from the upstream coils S1 and S101 and the downstream coil signals S2 and S201 provided by measuring the upstream coil signal S1 and the downstream coil signal S2 containing the phase difference between upstream vibration and downstream vibration of the tube 15, and continuously outputs flow rate data D50' indicating the mass flow rate of the fluid. For the internal circuit, see FIG. 2.

In the example, the timing signal generator 82 is connected to the CPU 6, inputs control data D82 from the CPU 6, and generates the clock signals CK31 to CK34 and a clock signal CK50 for signal switch based on the control data D82. The clock signal CK31 is output from the timing signal generator 82 to the switch circuit 31.

The clock signal CK32 is output from the timing signal generator 82 to the switch circuit 32. The clock signal CK33 is output from the timing signal generator 82 to the switch circuit 33. The clock signal CK34 is output from the timing signal generator 82 to the switch circuit 34. The clock signal CK50 is output from the timing signal generator 82 to the digital signal processing circuit 50'.

When the converter 72 is thus configured, it is made possible to correct the fluctuation factor of flow rate measurement caused by a change in the environmental condition of the signal path from input of the upstream coil signal S1 to output of the upstream coil signals S1' and S102' in the path #1, the signal path from input of the downstream coil signal S2 to output of the downstream coil signals S2' and S201', etc., based on the reference signals S301 to S304 without interrupting the flow rate measurement.

Subsequently, a function example of the digital signal processing circuit 50' will be discussed with reference to FIG. 6. The digital signal processing circuit 50' shown in FIG. 6 adopts the same configuration and connection method as the digital signal processing circuit 50 described in the first embodiment; they differ in signals input to the first signal processor 51 and the second signal processor 55.

The signal processor 51 includes a phase difference calculator 52, a zero compensation value generator 53, and a zero compensator 54. In the signal processor 51, the phase difference calculator 52 calculates the difference between the upstream coil signal S1' and the downstream coil signal S201' output from the A/D converter and outputs the flow rate signal S52 to the zero compensator 54.

The zero compensation value generator 53 includes a phase difference calculator 501 and an averaging section 502. In the example, when a phase difference calculator 56 detects the flow rate signal S56, the zero compensation value generator 53 generates a zero compensation value $S\epsilon 1'$. For example, the phase difference calculator 501 calculates the difference between the reference signal S301' and the reference signal S302' output from the A/D converter 40.

The averaging section 502 averages a difference output signal S501' of the phase difference calculator 501 and generates the zero compensation value $S\epsilon 1'$. The zero compensation value Se is output to the zero compensator 54. The zero compensator 54, for example, subtracts the zero compensation value $S\epsilon 1'$ from the flow rate signal S52 and outputs a post-corrected flow rate signal S54' to a signal selector 59.

The signal processor 55 includes a phase difference calculator 56, a zero compensation value generator 57, and a zero compensator 58. In the signal processor 55, the phase difference calculator 56 calculates the difference between the downstream coil signal S2' and the upstream coil signal S102' output from the A/D converter and outputs the flow rate signal S56 to the zero compensator 58.

The zero compensation value generator 57 includes a phase difference calculator 503 and an averaging section 504. In the example, when a phase difference calculator 52 detects the flow rate signal S52, the zero compensation value generator 57 generates a zero compensation value $S\epsilon 2'$. For example, the phase difference calculator 503 calculates the difference between the reference signal S303' and the reference signal S304' output from the A/D converter 40.

The averaging section 504 averages a difference output signal S503' of the phase difference calculator 503 and generates the zero compensation value $S\epsilon 2'$. The zero compensation value $S\epsilon 2'$ is output to the zero compensator 58. The zero compensator 58, for example, subtracts the zero compensation value $S\epsilon 2'$ from the flow rate signal S56 and outputs a post-corrected flow rate signal S58' to the signal selector 59.

The signal selector 59 connected to the zero compensators 54 and 58 described above alternately selects the post-corrected flow rate signal S54' output from the zero compensator 54 of the signal processor 51 and the post-corrected flow rate signal S58' output from the zero compensator 58 of the signal processor 55 based on the clock signal CK50 and continuously outputs the flow rate data D50' to the CPU 6.

Figure 7:
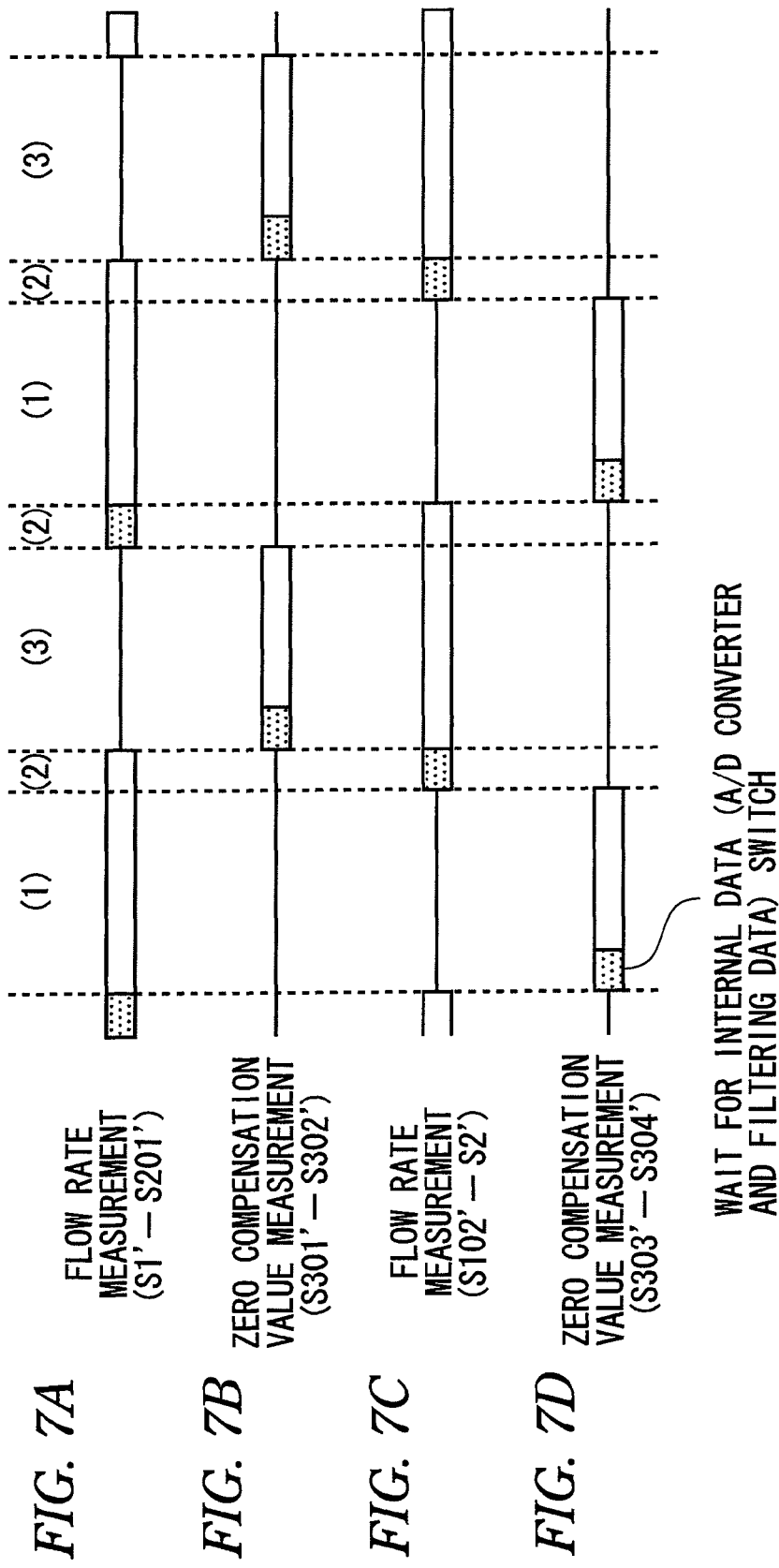
FIGS. 7A to 7D are time charts showing an operation example of a converter 72.

Subsequently, an operation example of the converter 72 of the Coriolis mass flowmeter 100 will be discussed with reference to FIGS. 7A to 7D. FIG. 7A is a time chart showing a flow rate measurement example in the path #1, FIG. 7B is a time chart showing a zero compensation value measurement example in the path #1, FIG. 7C is a time chart showing a flow rate measurement example in the path #2, and FIG. 7D is a time chart showing a zero compensation value measurement example in the path #2. The horizontal axes of FIGS. 7A to 7D indicate time t.

In the embodiment, to obtain the flow rate data D50' to find the mass flow rate Q of a fluid, two types of basic processing are repeated and the phase difference corresponding to the flow rate signal compensating for the zero point error component is measured.

In the first processing, the signal processor 51 measures the phase difference between the upstream coil signal S1' and the downstream coil signal S201' corresponding to the first flow rate signal S52 in the path #1 and finds the net phase difference of the flow rate signal S52 using the first zero compensation value $S\epsilon 1'$ calculated in the path #1. Concurrently with the operation, the phase signal processor 55 measures the phase difference between the reference signal S303' and the reference signal S304' (second zero compensation value component) in path #2.

In the second processing, after a lapse of any time period, the signal processor 55 measures the phase difference between the downstream coil signal S2' and the upstream coil signal S102' corresponding to the second flow rate signal S56 in the path #2 and finds the net phase difference of the flow rate signal S56 using the second zero compensation value SET calculated in the path #2. Concurrently with the operation, the phase signal processor 51 measures the phase difference between the reference signal S301' and the reference signal S302' (first zero compensation value component) in path #1. In the first repetition, the zero compensation value $S\epsilon 1$ in the path #1 becomes an undefined value and thus may be initialized with any value as in the first embodiment. In the example, in initialization, the switch circuit 31 selects the upstream coil signal S1, the switch circuit 32 selects the downstream coil signal S201, and the switch circuit 34 selects the downstream coil signal S2.

With this as an operation condition, according to the operation example of the converter 72 shown in FIG. 5, to execute the first processing described above, the switch circuit 31 switches the upstream coil signal S1 so as to input the upstream coil signal S1 to the input amplifier 1 based on the clock signal CK31 shown in FIG. 5 in time period (1) shown in FIG. 7A. In the example, the switch circuit 31 selects the path #1 in the initialization and thus continues to select it. The input amplifier 1 connected to the switch circuit 31 amplifies the upstream coil signal S1 and outputs the amplified upstream coil signal S1 to the A/D converter 40.

In the same time period (1), the switch circuit 32 switches the path #2 so as to input the downstream coil signal S201 to the input amplifier 21 based on the clock signal CK32 shown in FIG. 5. In the example, the switch circuit 32 selects the downstream coil signal S201 in the initialization and thus continues to select it. The input amplifier 21 connected to the switch circuit 32 amplifies the downstream coil signal S201 and outputs the amplified upstream coil signal S201 to the A/D converter 40.

In the same time period (1), the switch circuit 33 switches the reference signal transmission path so as to input the reference signal S303 to the input amplifier 22 based on the clock signal CK33 shown in FIG. 5. In the example, the switch circuit 33 switches input connection from the upstream coil signal S102 in the initialization to the reference signal S303. The input amplifier 22 connected to the switch circuit 33 amplifies the reference signal S303 and outputs the amplified reference signal S303 to the A/D converter 40.

In the same time period (1), the switch circuit 34 switches the reference signal transmission path so as to input the reference signal S304 to the input amplifier 2 based on the clock signal CK34 shown in FIG. 5. In the example, the switch circuit 34 switches input connection from the downstream coil signal S2 in the initialization to the reference signal S304. The input amplifier 2 connected to the switch circuit 34 amplifies the reference signal S304 and outputs the amplified reference signal S304 to the A/D converter 40.

The A/D converter 40 converts the analog amplified upstream coil signal S1 and the analog amplified downstream coil signal S201 into digital signals and outputs the digital upstream coil signal S1' and the digital downstream coil signal S201' to the digital signal processing circuit 50. The A/D converter 40 converts the analog amplified reference signals S303 and 5304 into digital signals and outputs the digital reference signals S303' and S304' to the digital signal processing circuit 50'.

Figure 6:
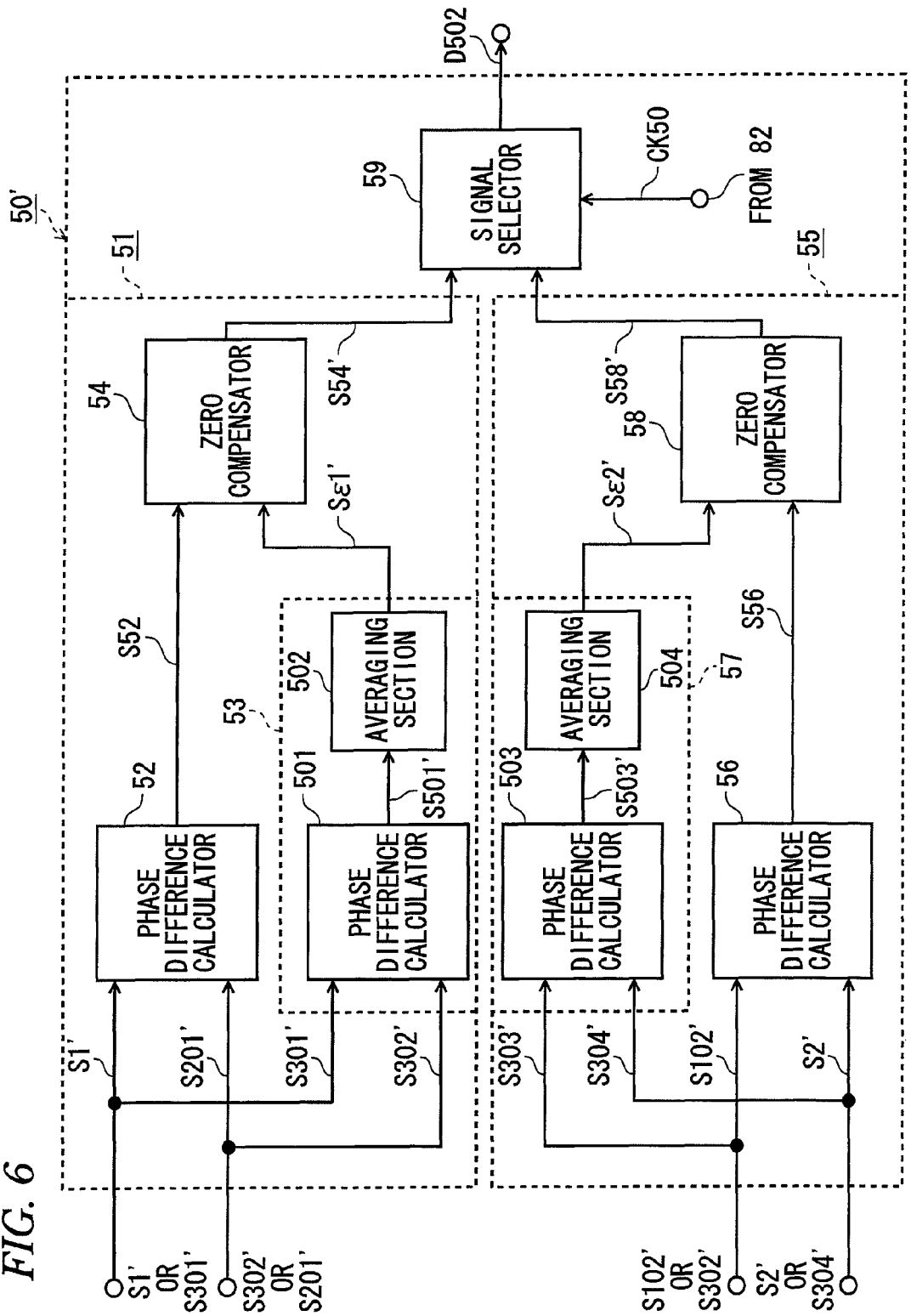
FIG. 6 is a block diagram showing an internal configuration example of a digital signal processing circuit 50'.

In the digital signal processing circuit 50', the signal processing circuit 51 shown in FIG. 6 calculates the difference between the upstream coil signal S1' and the downstream coil signal S201' and outputs the first flow rate signal S52 in the first time period (1) shown in FIG. 7A. The flow rate signal S52 is provided by calculating the difference between the upstream coil signal S1' and the downstream coil signal S201' by the phase difference calculator 52 of the signal processor 51. The flow rate signal S52 is output to the zero compensator 58.

On the other hand, the signal processor 55 shown in FIG. 6 detects the difference between the digital reference signals 303' and 304' and generates the zero compensation value Sε2' in the first time period (1) shown in FIG. 7D. At this time, in the zero compensation value generator 57, when the phase difference calculator 503 calculates the difference between the digital reference signals S303' and S304', the averaging section 504 averages the difference output signal S503' of the phase difference calculator 503 and generates the zero compensation value Sε2'. The zero compensation value Sε2' is output to the zero compensator 58.

Accordingly, the phase difference between the upstream coil signal S1' and the downstream coil signal S201' corresponding to the flow rate signal S52 is measured in the path #1 and the net phase difference of the flow rate signal S52 can be found using the previously calculated first zero compensation value SEP in the path #1 (except the initial value) and concurrently with the processing, the phase difference between the digital reference signals S303' and S304' (second zero compensation value component) can be measured in the path #2.

According to an operation example of the converter 72 shown in FIG. 7B, when a transition is made from the first processing to the second processing, the switch circuit 31 maintains a state in which the upstream coil signal S1 is output to the A/D converter 40 through the input amplifier 1 in the first time period (2) shown in FIG. 7A. The switch circuit 32 also maintains a state in which the downstream coil signal S201 is output to the A/D converter 40 through the input amplifier 21 in the time period (2).

The time period (2) is the time until data held in the A/D converter 40, data used for filtering, etc., is switched by the switch circuits 31 to 34 and is replaced with data after the switch. The time period (2) may be set as desired. In the example, the switch circuits 31 and 32 maintain previous connection of the path #1.

In contrast, the switch circuit 33 switches connection from the reference signal S303 to the upstream coil signal S102 so as to output the upstream coil signal S102 in place of the reference signal S303 to the A/D converter 40 through the input amplifier 22. The upstream coil signal S102 is input to the A/D converter 40 through the input amplifier 22.

The switch circuit 34 switches connection from the reference signal S304 to the upstream coil signal S102 so as to output the downstream coil signal S2 in place of the reference signal S304 to the A/D converter 40 through the input amplifier 2. The downstream coil signal S2 is input to the A/D converter 40 through the input amplifier 2.

In the digital signal processing circuit 50', the signal processing circuit 51 shown in FIG. 6 calculates the difference between the upstream coil signal SP and the downstream coil signal S201' in the time period (2) shown in FIG. 7A, continues flow rate measurement, and continuously outputs the first flow rate signal S52 by the time period (2) shown in FIG. 7A. After waiting for switch of the switch circuit 33, 34, the signal processing circuit 51 calculates the difference between the reference signal S301' and the reference signal S302' and generates the zero compensation value Sε1' in the time period (3) shown in FIG. 7B. The signal processing circuit 51 corrects the flow rate signal S52 in the next (second) time period (1) shown in FIG. 7A according to the zero compensation value Sε1'.

After waiting for switch of the switch circuit 33, 34 in the time period (2) shown in FIG. 7C, the signal processing circuit 55 starts to calculate the difference between the upstream coil signal S102' and the downstream signal S2' and starts to output the second flow rate signal S56 in the time period (3) shown in FIG. 7C. On the other hand, after waiting for switch of the switch circuit 31, 32 in the time period (3) shown in FIG. 7B, the signal processing circuit 51 shown in FIG. 6 starts to calculate the difference between the reference signal S301' and the reference signal S302' and starts to generate the first zero compensation value Sε1' in the time period (3) shown in FIG. 7B.

Accordingly, the phase difference measurement between the upstream coil signal S1' and the downstream coil signal 201' corresponding to the first flow rate signal S52 in the path #1 is continued and concurrently with this processing, a transition can be made from generation of the second zero compensation value Sε2' to phase difference measurement between the downstream coil signal S2' and the upstream coil signal S102' corresponding to the second flow rate signal S56 and generation of the first zero compensation value Sε1' can be started without producing a discontinuous portion in the path #2.

According to the operation example of the converter 72 shown in FIG. 7C, to execute the second processing described above, the switch circuit 31 switches connection from the upstream coil signal S1 to the reference signal S301 so as to input the reference signal S301 in place of the upstream coil signal S1 to the input amplifier 1 based on the clock signal CK31 shown in FIG. 5 in the time period (3) shown in FIG. 7B. The input amplifier 1 connected to the switch circuit 31 amplifies the reference signal S301 and outputs the amplified reference signal S301 to the A/D converter 40.

In the same time period (3), the switch circuit 32 switches connection from the downstream coil signal S201 to the reference signal S302 so as to input the reference signal S302 in place of the downstream coil signal S201 to the input amplifier 21 based on the clock signal CK32 shown in FIG. 5. The input amplifier 21 connected to the switch circuit 32 amplifies the reference signal S302 and outputs the amplified reference signal S302 to the A/D converter 40.

In the same time period (3), the switch circuit 33 switches connection from the reference signal S303 to the upstream coil signal S102 so as to input the upstream coil signal S102 in place of the reference signal S303 to the input amplifier 22 based on the clock signal CK33 shown in FIG. 5. The input amplifier 22 connected to the switch circuit 33 amplifies the upstream coil signal S102 and outputs the amplified upstream coil signal S102 to the A/D converter 40.

In the same time period (3), the switch circuit 34 switches connection from the reference signal S304 to the downstream coil signal S2 so as to input the downstream coil signal S2 in place of the reference signal S304 to the input amplifier 2 based on the clock signal CK34 shown in FIG. 5. The input amplifier 2 connected to the switch circuit 34 amplifies the downstream coil signal S2 and outputs the amplified downstream coil signal S2 to the A/D converter 40.

The A/D converter 40 converts the analog amplified reference signals S301 and S302 into digital signals and outputs the digital reference signals S301' and S302' to the digital signal processing circuit 50'. The A/D converter 40 converts the analog amplified upstream coil signal S102 and the analog amplified downstream coil signal S2 into digital signals and outputs the digital upstream coil signal S102' and the digital downstream coil signal S2' to the digital signal processing circuit 50'.

In the digital signal processing circuit 50', the signal processing circuit 55 shown in FIG. 6 calculates the difference between the downstream coil signal S2' and the upstream coil signal S102' and outputs the second flow rate signal S52 in the first time period (3) shown in FIG. 7C. The flow rate signal S56 is provided by calculating the difference between the downstream coil signal S2' and the upstream coil signal S102' by the phase difference calculator 56 of the signal processor 55. The flow rate signal S56 is output to the zero compensator 58. The zero compensator 58 subtracts the zero compensation value SET from the flow rate signal S56. Accordingly, it is made possible to correct the flow rate signal S56 with the zero compensation value Sε2' generated in FIG. 7D.

On the other hand, the signal processor 51 shown in FIG. 6 detects the difference between the reference signal 301' and the reference signal 302' and generates the zero compensation value Sε1'. At this time, in the zero compensation value generator 53, when the phase difference calculator 501 calculates the difference between the reference signal 301' and the reference signal 302', the averaging section 502 averages the difference output signal S501' of the phase difference calculator 501 and generates the zero compensation value Sε1'. The zero compensation value Sε1' is output to the zero compensator 54. The first flow rate signal S52 is corrected in the next (second) time period (1) shown in FIG. 7A. At this time, the zero compensator 54 subtracts the zero compensation value Sε1' from the flow rate signal S52.

Likewise, the zero compensation value Sε2' obtained in the time period (1) shown in FIG. 7D corrects the second flow rate signal S56 in the next (second) time period (3) shown in FIG. 7B. The corrected flow rate signal S54' output from the zero compensator 54 and the corrected flow rate signal S58' output from the zero compensator 58 are input to the signal selector 59. The signal selector 59 alternately selects the corrected flow rate signal S54' and the corrected flow rate signal S58' based on the clock signal CK50 and continuously outputs the signal as the flow rate data D50' to the CPU 6.

Accordingly, the phase difference between the downstream coil signal S2' and the upstream coil signal S102' corresponding to the flow rate signal S56 is measured in the path #2 and the net phase difference of the flow rate signal S56 can be found using the previously calculated second zero compensation value Sε2' in the path #2 and concurrently with the processing, the phase difference between the digital reference signals S301' and S302' (first zero compensation value component) can be measured in the path #1.

Table 2 lists combinations of the upstream coil signals S1' and S102', the downstream coil signals S2' and S201', and the reference signals S301', S302', S303', and S304' transmitted through the path #1 and the path #2.

TABLE 2

| Time period No. | Path #1 | | Path #2 | |
|---|---|---|---|---|
| | Signal 1 | Signal 2 | Signal 1 | Signal 2 |
| (1) | Upstream coil signal S1' | Downstream coil signal S201' | Reference signal S303' | Reference signal S304' |
| (2) | Upstream coil signal S1' | Downstream coil signal S201' | Upstream coil signal S102' | Downstream coil signal S2' |
| (3) | Reference signal S301' | Reference signal S302' | Upstream coil signal S102' | Downstream coil signal S2' |

According to Table 2, signal 1 transmitted through the path #1 in the time period (1) is the upstream coil signal S1' and signal 2 is the downstream coil signal S201'. Signal 1 transmitted through the path #2 is the reference signal S303' and signal 2 is the reference signal S304'. Signal 1 transmitted through the path #1 in the time period (2) is the upstream coil signal S1' and signal 2 is the downstream coil signal S201'.

Signal 1 transmitted through the path #2 is the upstream coil signal S102' and signal 2 is the downstream coil signal S2'. Signal 1 transmitted through the path #1 in the time period (3) is the reference signal S301' and signal 2 is the reference signal S302. Signal 1 transmitted through the path #2 is the upstream coil signal S102' and signal 2 is the downstream coil signal S2'.

Thus, the Coriolis mass flowmeter 200 of the second embodiment includes the digital signal processing circuit 50' having signal processors 51 and 55 to measure the mass flow rate Q of a fluid flowing through the tube 15. When the digital signal processing circuit 50' inputs the upstream coil signals S1' and S102', the downstream coil signals S2' and S201', and the reference signals S301', S302', S303', and 5304' output from the A/D converter 40 in a time division manner, the digital signal processing circuit 50' calculates the first flow rate signal S52 indicating the input mass flow rate Q of the fluid and corresponding to the phase difference between the upstream coil signal S1' and the downstream coil signal S201' and the second flow rate signal S56 corresponding to the phase difference between the downstream coil signal S2' and the upstream coil signal S102'. When the signal processor 55 detects the flow rate signal S56, the signal processor 51 generates the zero compensation value Sε1'. When the signal processor 51 detects the flow rate signal S52, the signal processor 55 generates the zero compensation value Sε2'.

Therefore, measurement of the phase difference of vibration corresponding to the flow rate signal S52 and measurement of the zero compensation value S∈2' of the zero point signal compensation value of the signal processor 55 can be executed concurrently and measurement of the phase difference of vibration corresponding to the flow rate signal S56 and measurement of the zero compensation value S∈1' of the zero point signal compensation value of the signal processor 51 can be executed concurrently. Thus, it is made possible to correct the fluctuation factor of flow rate measurement caused by a change in the environmental condition of the signal path from input of the upstream coil signal S1 to output of the flow rate signal S52, the signal path from input of the downstream coil signal S2 to output of the flow rate signal S56, etc., without interrupting flow rate measurement A sufficient number of samples of the zero point signal compensation values (average values) in the signal processor 51 and the signal processor 55 can be ensured, the error component contained in the zero point signal compensation value can be decreased, and stable flow rate measurement is made possible as in the first embodiment. Moreover, the need for synchronizing the upstream coil signal S1 and the downstream coil signal S2 with each other, sampling, and executing analog-to-digital conversion as in the conventional example is eliminated, and it is made possible to use a general-purpose A/D converter. Accordingly, it becomes easy to select components in the digital signal processing circuit 50', and the cost of the Coriolis mass flowmeter 200 can be reduced.

In the second embodiment, the zero compensation values S∈1' and S∈2' are calculated using the reference signals S301', S302', S303', and S304' of any frequencies. Thus, the frequencies of the flow rate signals S52 and S56 do not fluctuate in the digital signal processing circuit 50' and it is made possible to extract (measure) the frequencies of the upstream coil signal S1, etc., with accuracy as compared with the case where the upstream coils S1' and S102' and the downstream coil signals S2' and S202' are used in the digital signal processing circuit 50 as in the first embodiment.

Accordingly, it becomes unnecessary to select filters to allow different fluctuating frequencies to pass through as required, and execute, etc. The reference signals S301', S302', S303', and 5304' are used, whereby it is made possible to use a filter to allow a specific frequency to pass through.

When a fluid to be measured contains a plurality of components, etc., various noise components are contained in the upstream coil signals S1' and S102' and the downstream coil signals S2' and S202'. Moreover, if the characteristics of the noise components rapidly change with the passage of the time, when the zero compensation value is calculated using the reference signals S301', S302', S303', and S304' in place of the upstream coil signals S1' and S102' and the downstream coil signals S2' and S202', it is made possible to stably calculate the zero compensation values S∈1 and S∈2.

Third Embodiment

Subsequently, a Coriolis mass flowmeter 300 of a third embodiment of the invention will be discussed with reference to FIG. 8. In the embodiment, a zero compensation value S∈1 in path #1 is calculated from downstream coil signals S201' and S202' and a zero compensation value S62 in path #2 is calculated from upstream coil signals S101' and S102'.

Figure 8:
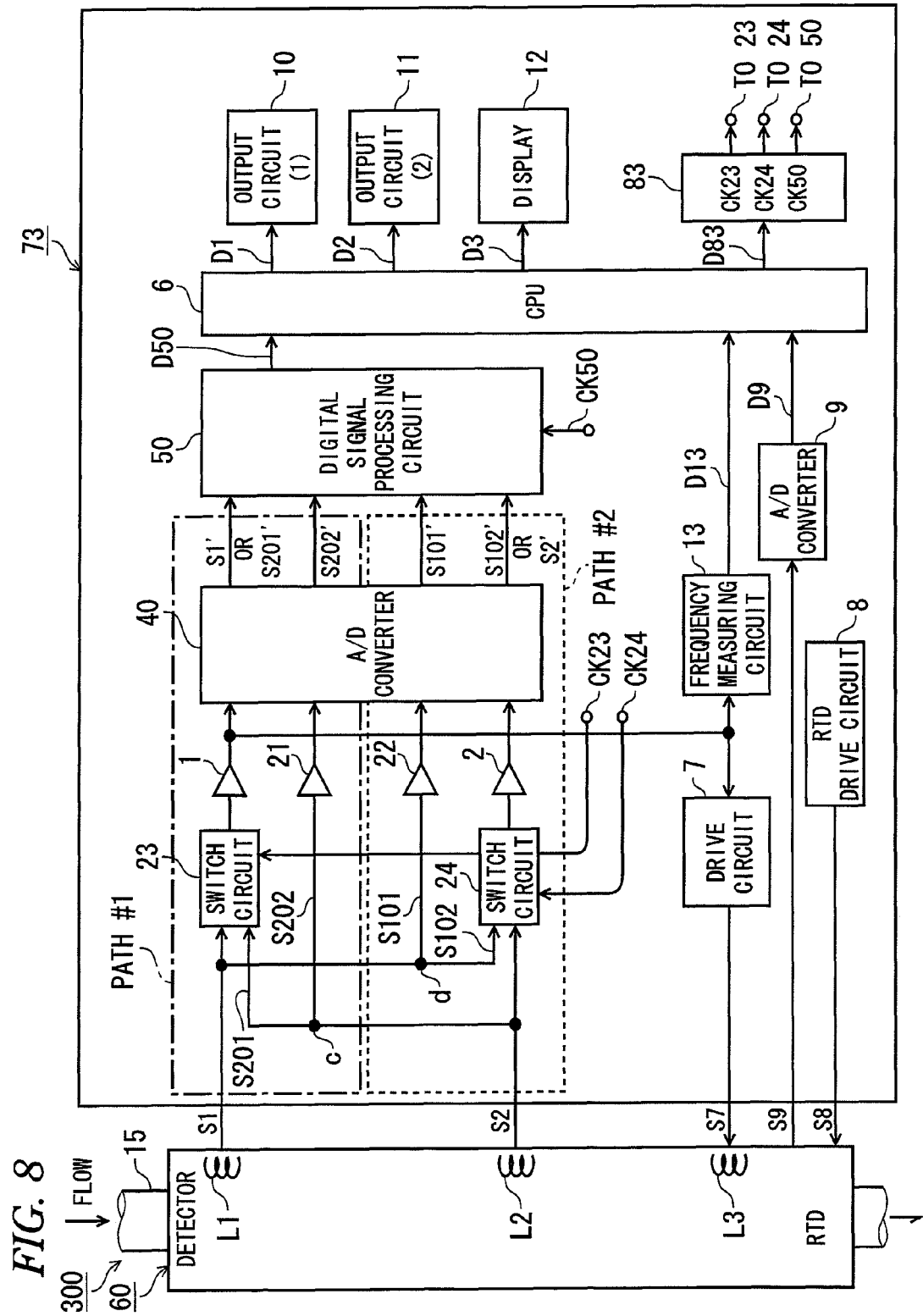
FIG. 8 is a block diagram showing a configuration example of a Coriolis mass flowmeter 300 according to a third embodiment of the invention.

The Coriolis mass flowmeter 300 shown in FIG. 8 vibrates a tube 15 through which a fluid flows, and measures the mass flow rate of the fluid flowing through the tube 15 from the phase difference between upstream vibration and downstream vibration of the tube 15. The Coriolis mass flowmeter 300 includes a detector 60 and a converter 73. The detector 60 is similar to that of the first embodiment and therefore will not be discussed again.

The converter 73 includes input amplifiers 1, 2, 21, and 22, a CPU 6, a drive circuit 7, an RTD drive circuit 8, A/D converters 9 and 40, output circuits 10 and 11, a display 12, a frequency measuring circuit 13, switch circuits 23 and 24, a digital signal processing circuit 50, and a timing signal generator 83. Components with names and signs identical with those of the first embodiment have the same functions and therefore will not be discussed again.

In the example, in the figure, the portion surrounded by an alternate long and short dash line forms path #1 and the portion surrounded by a dotted line forms path #2. A branch point c is provided in the path #1, a transmission path is branched into three parts at the branch point c, and the three parts are connected to the input amplifier 21 and the switch circuits 23 and 24. A branch point b is provided in the path #2, a transmission path is branched into three parts at the branch point d, and the three parts are connected to the input amplifier 22 and the switch circuits 23 and 24.

In the example, upstream coil signals S101 and S102 are branched from an upstream coil signal S1 at the branch point c, and downstream coil signals S201 and S202 are branched from a downstream coil signal S2 at the branch point d. The input amplifier 22 is connected to the branch point c. The input amplifier 22 amplifies the upstream coil signal S101 and outputs the amplified upstream coil signal S101 to the A/D converter 40. The input amplifier 21 is connected to the branch point d. The input amplifier 21 amplifies the downstream coil signal S202 and outputs the amplified downstream coil signal S202 to the A/D converter 40.

The switch circuit 23 switches either the upstream coil signal S1 or the downstream coil signal S201 in a time division manner based on a clock signal CK23 so that a digital signal provided by analog-to-digital conversion can be input to the digital signal processing circuit 50 (signal processor 51 shown in FIG. 2). Likewise, the switch circuit 24 switches either the downstream coil signal S2 or the upstream coil signal S102 in a time division manner based on a clock signal CK24 so that a digital signal provided by analog-to-digital conversion can be input to the digital signal processing circuit 50 (signal processor 55 shown in FIG. 2) (switch control).

In the example, the input amplifier 1 is connected to the switch circuit 23 and the input amplifier 2 is connected to the switch circuit 24. For example, the switch circuit 23 switches input of the input amplifier 1 and connection of the upstream coil signal S1 and the downstream coil signal S201 in a time division manner based on the clock signal CK23, selects the upstream coil signal S1 or the downstream coil signal S201, and outputs the selected signal to the input amplifier 1. The clock signal CK23 is supplied from the timing signal generator 83 to the switch circuit 23.

The switch circuit 24 switches input of the input amplifier 2 and connection of the upstream coil signal S102 and the downstream coil signal S2 in a time division manner based on the clock signal CK24, selects the upstream coil signal S102 or the downstream coil signal S2, and outputs the selected signal to the input amplifier 2. The clock signal CK24 is supplied from the timing signal generator 83 to the switch circuit 24. Both input amplifiers 1 and 2 are connected to the A/D converter 40. For the function of the A/D converter, see the first embodiment.

The digital signal processing circuit 50 is connected to the A/D converter 40 as in the first embodiment. The digital signal processing circuit 50 includes a signal processor 51, a signal processor 55, and a signal selector 59. For an internal configuration example of the digital signal processing circuit 50, see FIG. 2.

In the digital signal processing circuit 50 of the third embodiment, the signal processor 51 calculates the difference between an upstream coil signal S1' and a downstream coil signal S202' output from the A/D converter 40 and outputs a flow rate signal S52. For example, in the signal processor 51 shown in FIG. 2, in the third embodiment, the upstream coil signal S1' and the downstream coil signal S202' are input to a phase difference calculator 52. The phase difference calculator 52 calculates the difference between the upstream coil signal S1' and the downstream coil signal S202' and outputs a flow rate signal S52.

The signal processor 51 calculates the difference between the downstream coil signal S201' output from the A/D converter 40 and the downstream coil signal S202' flowing through signal path #2 from input of a flow rate signal S56 to output, generates a zero compensation value Sε1, and corrects the flow rate signal S52 with the zero compensation value Sε1.

At the time, in the third embodiment, the downstream coil signal S201' and the downstream coil signal S202' are input to the phase difference calculator 501. The phase difference calculator 501 calculates the difference between the downstream coil signal S201' and the downstream coil signal S202', and outputs a difference output signal S501 to an averaging section 502.

The signal processor 55 shown in FIG. 2 calculates the difference between a downstream coil signal S2' and the upstream coil signal S101' output from the A/D converter 40 and outputs a flow rate signal S56. For example, in the signal processor 55 shown in FIG. 2, in the third embodiment, the upstream coil signal S101' and the downstream coil signal S2' are input to a phase difference calculator 56. The phase difference calculator 56 calculates the difference between the upstream coil signal S101' and the downstream coil signal S2' and outputs a flow rate signal S56.

The signal processor 55 calculates the difference between the upstream coil signal S101' output from the A/D converter 40 and the upstream coil signal S102' flowing through signal path #1 to detection of the flow rate signal S52, generates a zero compensation value Sε2, and corrects the flow rate signal S56 with the zero compensation value Sε2. At the time, in the third embodiment, the upstream coil signal S101' and the upstream coil signal S102' are input to a phase difference calculator 503. The phase difference calculator 503 calculates the difference between the upstream coil signal S101' and the upstream coil signal S102', and outputs a difference output signal S503 to the averaging section 502.

The signal selector 59 alternately selects a corrected flow rate signal S54 output from the signal processor 51 and a corrected flow rate signal S58 output from the signal processor 55 and outputs flow rate data D50. In the embodiment, when the signal processor 55 selects the flow rate signal S56, the signal processor 51 generates the zero compensation value Sε1. When the signal processor 51 selects the flow rate signal S52, the signal processor 55 generates the zero compensation value Sε2.

In the example, the timing signal generator 83 is connected to the CPU 6. The timing signal generator 83 inputs control data D83 from the CPU 6 and generates clock signals CK23, CK24, and CK50 for signal switch based on the control data D83. The clock signal CK23 is output from the timing signal generator 83 to the switch circuit 23. The clock signal CK24 is output from the timing signal generator 83 to the switch circuit 24. The clock signal CK50 is output from the timing signal generator 83 to a digital signal processing circuit 50'. Other functions of the converter are similar to those of the first embodiment and therefore will not be discussed again.

Table 3 lists combinations of the upstream coil signals S1', S101', and S102' and the downstream coil signals S2', S201', and S202' transmitted through the path #1 and the path #2.

TABLE 3

| Time period No. | Path #1 | | Path #2 | |
|---|---|---|---|---|
| | Signal 1 | Signal 2 | Signal 1 | Signal 2 |
| (1) | Upstream coil signal S1' | Downstream coil signal S202' | Upstream coil signal S101' | Upstream coil signal S102' |
| (2) | Upstream coil signal S1' | Downstream coil signal S202' | Upstream coil signal S101' | Downstream coil signal S2' |
| (3) | Downstream coil signal S201' | Downstream coil signal S202' | Upstream coil signal S101' | Downstream coil signal S2' |

According to Table 3, signal 1 transmitted through the path #1 in time period (1) is the upstream coil signal S1' and signal 2 is the downstream coil signal S202'. Signal 1 transmitted through the path #2 is the upstream coil signal S101' and signal 2 is the upstream signal S102'.

Signal 1 transmitted through the path #1 in time period (2) is the upstream coil signal S1' and signal 2 is the downstream coil signal S202'. Signal 1 transmitted through the path #2 is the upstream coil signal S102' and signal 2 is the downstream coil signal S2'.

Signal 1 transmitted through the path #1 in time period (3) is the downstream coil signal S201' and signal 2 is the downstream coil signal S202'. Signal 1 transmitted through the path #2 is the upstream coil signal S101' and signal 2 is the downstream coil signal S2'.

Thus, according to the Coriolis mass flowmeter 300 of the third embodiment, to measure mass flow rate Q of the fluid flowing through the tube 15, the signal processor 51 calculates the difference between the downstream coil signal S201' output from the A/D converter and the downstream coil signal S202' flowing through the signal path #2 from input of the flow rate signal S56 to output, generates the zero compensation value Sε1, and corrects the flow rate signal S52 with the zero compensation value Sε1.

The signal processor 55 calculates the difference between the upstream coil signal S101' output from the A/D converter 40 and the upstream coil signal S102' flowing through the signal path #1 to detection of the flow rate signal S52, generates the zero compensation value Sε2, and corrects the flow rate signal S56 with the zero compensation value Sε2.

Therefore, measurement of the phase difference of vibration corresponding to the flow rate signal S52 and measurement of the zero compensation value Sε2 of the zero point signal compensation value of the signal processor 55 can be executed concurrently and measurement of the phase difference of vibration corresponding to the flow rate signal S56 and measurement of the zero compensation value S61 of the zero point signal compensation value of the signal processor 51 can be executed concurrently. Thus, it is made possible to correct the fluctuation factor of flow rate measurement caused by a change in the environmental condition of the signal path from input of the upstream coil signal S1 to output of the flow rate signal S52, the signal path from input of the downstream coil signal S2 to output of the flow rate signal S56, etc., with the zero compensation values Sε1 and Sε2 generated by exchanging the paths #1 and #2 without interrupting flow rate measurement According to the third embodiment, a sufficient number of samples of the zero point signal compensation values (average values) in the signal processor 51 and the signal processor 55 can be ensured, the error component contained in the zero point signal compensation value can be decreased, and stable flow rate measurement is made possible as in the first and second embodiments. Moreover, the need for synchronizing the upstream coil signal S1 and the downstream coil signal S2 with each other, sampling, and executing analog-to-digital conversion as in the conventional example is eliminated, and it is made possible to use a general-purpose A/D converter. Accordingly, it becomes easy to select components in the digital signal processing circuit 50, and the cost of the Coriolis mass flowmeter 300 can be reduced.

Fourth Embodiment

Subsequently, a Coriolis mass flowmeter 400 of a fourth embodiment of the invention will be discussed with reference to FIG. 9. In the embodiment, a single switch circuit 35 is included and path #1 or path #2 is switched in a time division manner so as to input either an upstream coil signal S1 or a downstream coil signal S2 output from a detector 60 to an input amplifier 36. That is, the two paths #1 and #2 share the switch circuit 35, the upstream coil signal S1 or the downstream coil signal S2 is input to a converter 74 in time series, and zero compensation values Sε1 and Sε2 are calculated.

Figure 9:
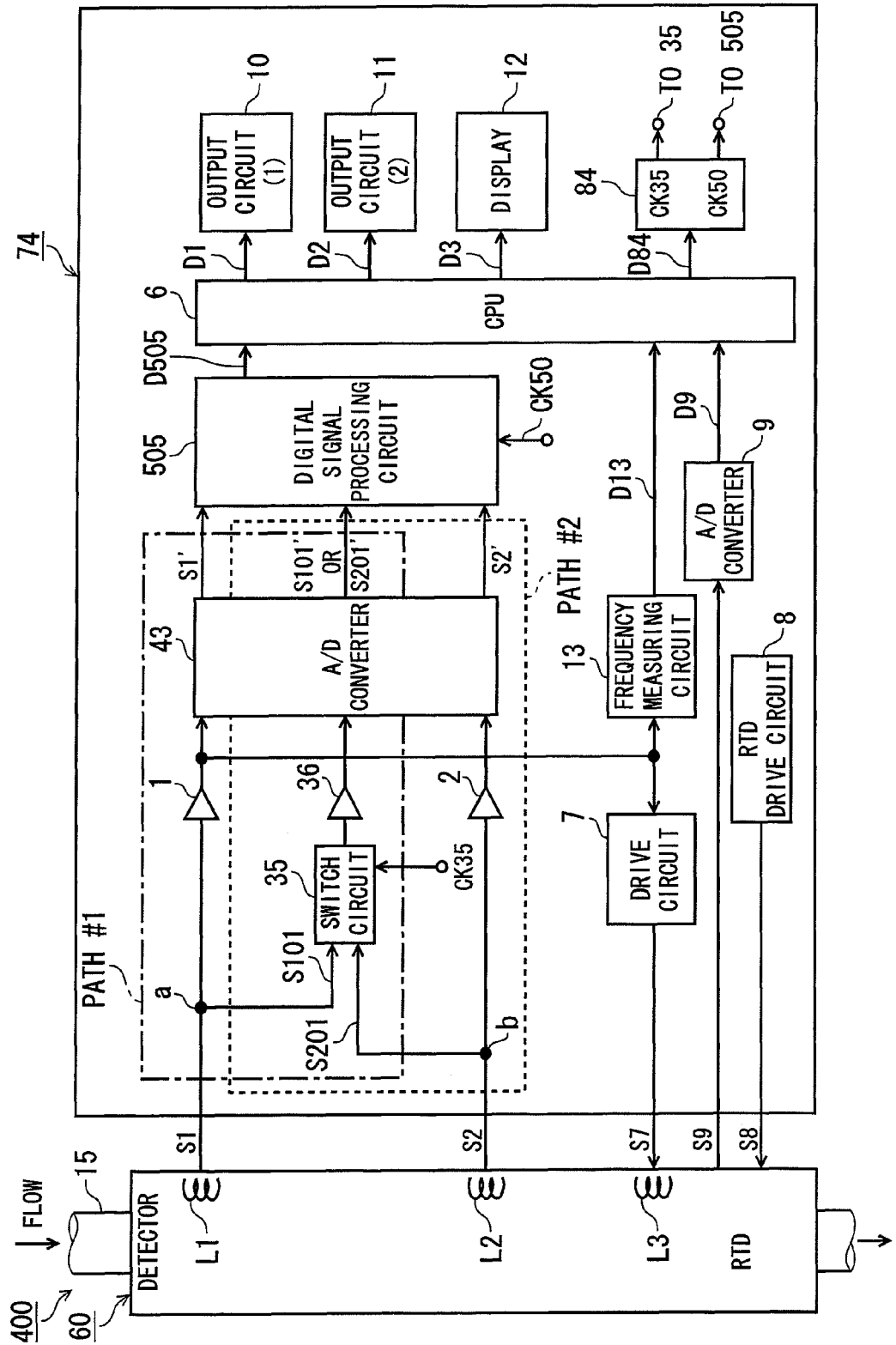
FIG. 9 is a block diagram showing a configuration example of a Coriolis mass flowmeter 400 according to a fourth embodiment of the invention.

The Coriolis mass flowmeter 400 shown in FIG. 9 vibrates a tube 15 through which a fluid flows, and measures the mass flow rate of the fluid flowing through the tube 15 from the phase difference between upstream vibration and downstream vibration of the tube 15. The Coriolis mass flowmeter 400 includes a detector 60 and a converter 74. The detector 60 is similar to that of the first embodiment and therefore will not be discussed again.

The converter includes input amplifiers 1, 2, and 36, a CPU 6, a drive circuit 7, an RTD drive circuit 8, A/D converters 9 and 43, output circuits 10 and 11, a display 12, a frequency measuring circuit 13, a switch circuit 35, a digital signal processing circuit 505, and a timing signal generator 84. Components with names and signs identical with those of the first embodiment have the same functions and therefore will not be discussed again.

In the example, in the figure, the portion surrounded by an alternate long and short dash line forms path #1 and the portion surrounded by a dotted line forms path #2. A branch point a is provided in the path #1, a transmission path is branched into two parts at the branch point a, and the two parts are connected to the input amplifier 1 and the switch circuit 35. A branch point b is provided in the path #2, a transmission path is branched into two parts at the branch point b, and the two parts are connected to the input amplifier 1 and the switch circuit 35.

In the example, an upstream coil signal S101 is branched from the upstream coil signal S1 at the branch point a, and a downstream coil signal S201 is branched from the downstream coil signal S2 at the branch point b. The input amplifier 1 is connected to the branch point a. The input amplifier 1 amplifies the upstream coil signal S1 and outputs the amplified upstream coil signal S1 to the A/D converter 43. The input amplifier 2 is connected to the branch point b. The input amplifier 2 amplifies the downstream coil signal S2 and outputs the amplified downstream coil signal S2 to the A/D converter 43.

The input amplifier 36 is connected to the switch circuit 35. The input amplifier 36 amplifies the upstream coil signal S101 or the downstream coil signal S201 and outputs the amplified upstream coil signal S101 or the amplified downstream coil signal S201 to the A/D converter 43. The input amplifiers 1, 2, and 36 are connected to the A/D converter 43. For the A/D converter 43, see the A/D converter 40 described in the first embodiment. The digital signal processing circuit 505 is connected to the A/D converter 43.

In the example, the timing signal generator 84 is connected to the CPU 6. The timing signal generator 84 inputs control data D84 from the CPU 6 and generates clock signals CK35 and CK50 for signal switch based on the control data D84. The clock signal CK35 is output from the timing signal generator 84 to the switch circuit 35. The clock signal CK35 is output from the timing signal generator 84 to the switch circuit 35. The clock signal CK50 is output from the timing signal generator 84 to the digital signal processing circuit 505.

An internal configuration example of the digital signal processing circuit 505 will be discussed with reference to FIG. 10. The digital signal processing circuit 505 shown in FIG. 10 has input terminals 511 to 513 as well as a signal processor 51, a signal processor 55, and a signal selector 59 as in the first embodiment. The input terminal 511 is connected to a phase difference calculator 52 and a phase difference calculator 501 of the signal processor 51. An upstream coil signal S1' is input to the input terminal 511.

The input terminal 512 is connected to the phase difference calculator 52 and the phase difference calculator 501 and a phase difference calculator 56 and a phase difference calculator 503 of the signal processor 55. An upstream coil signal S101' or a downstream coil signal S201' is input to the input terminal 512. The input terminal 513 is connected to the phase difference calculator 56 and the phase difference calculator 503 of the signal processor 55. A downstream coil signal S2' is input to the input terminal 513.

In the digital signal processing circuit 505, the phase difference calculator 52 of the signal processor 51 calculates the difference between the upstream coil signal S1' and the downstream coil signal S201' output from the A/D converter 40 and outputs a flow rate signal S52. The phase difference calculator 501 calculates the difference between the upstream coil signal S1' output from the A/D converter 40 and the upstream coil signal S101' flowing through the signal path #1 from input of the upstream coil signal S1 to output of the flow rate signal S52, generates the zero compensation value Sε1, and corrects the flow rate signal S52 with the zero compensation value Sε1. At the time, the phase difference calculator 501 outputs a difference output signal S501 to an averaging section 502.

The phase difference calculator 56 of the signal processor 55 calculates the difference between the downstream coil signal S2' and the upstream coil signal S101' output from the A/D converter and outputs a flow rate signal S56. The phase difference calculator 503 calculates the difference between the downstream coil signal S2' output from the A/D converter 40 and the downstream coil signal S201' flowing through the signal path #2 from input of the downstream coil signal S2 to output of the flow rate signal S56, generates the zero compensation value Sε2, and corrects the flow rate signal S56 with the zero compensation value Sε2. At the time, the phase difference calculator 503 outputs a difference output signal S503 to an averaging section 504.

The signal selector 59 alternately selects the corrected flow rate signal S54 output from the signal processor 59 and the corrected flow rate signal S58 output from the signal processor 55 and outputs flow rate data D50. In the embodiment, when the signal processor 55 detects the flow rate signal S56, the signal processor 51 generates the zero compensation value Sϵ1'. When the signal processor 51 detects the flow rate signal S52, the signal processor 55 generates the zero compensation value Sϵ2'.

Figure 11:
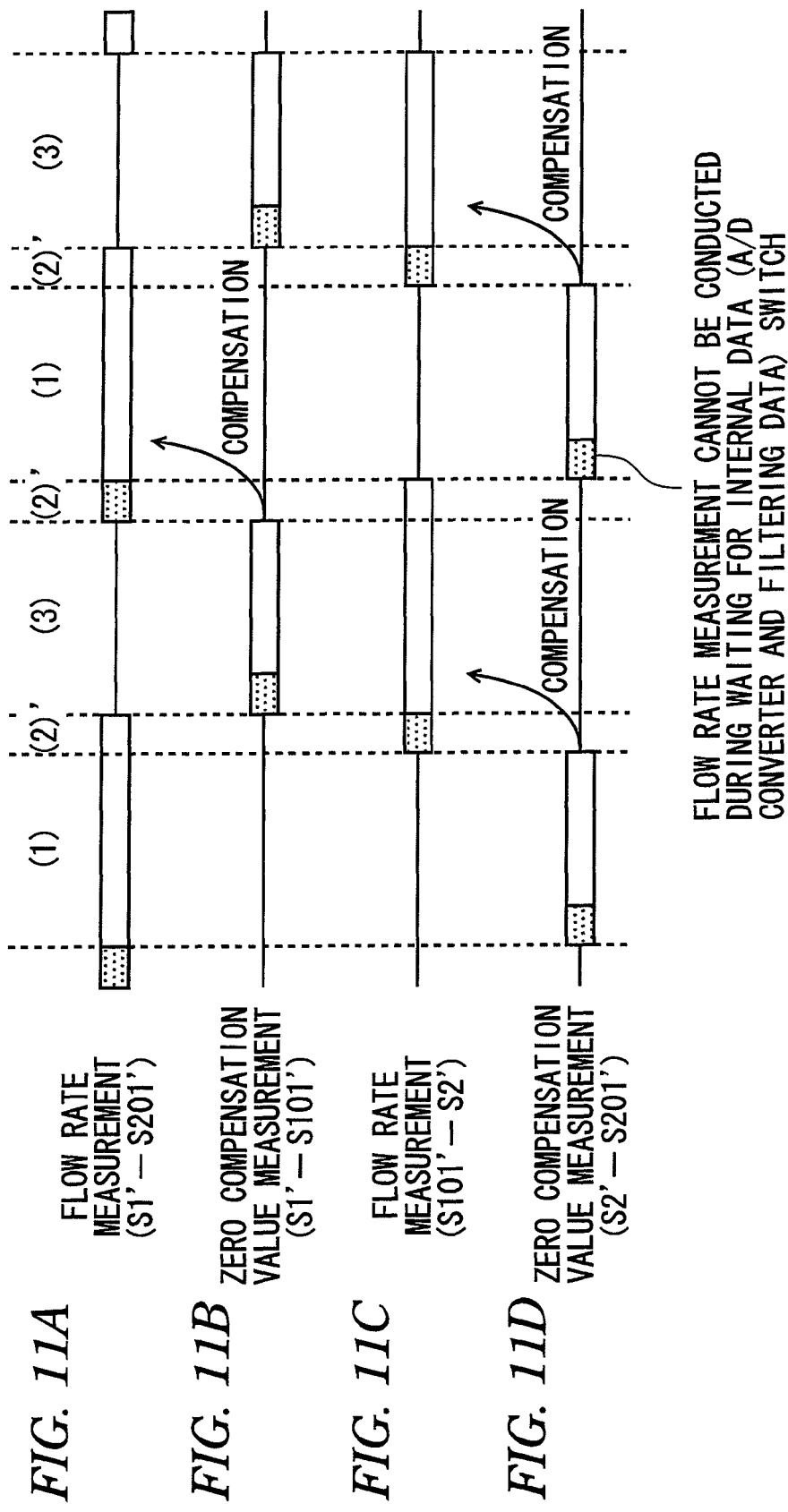
FIGS. 11A to 11D are time charts showing an operation example of a converter 74.

However, the single switch circuit 35 is included and thus a measurement-impossible time period occurs. In the measurement-impossible time period, the upstream coil signal S1 and the downstream coil signal S2 are input to the A/D converter 40, but it becomes impossible to measure the upstream coil signal S101 and the downstream coil signal S201. In FIG. 11, the measurement-impossible time period is indicated as time period (2)' and in the time period (2)', it becomes momentarily impossible to measure the flow rate. Other functions of the converter are similar to those of the first embodiment and therefore will not be discussed again.

Subsequently, an operation example of the converter 74 of the Coriolis mass flowmeter 400 will be discussed with reference to FIG. 10 and FIGS. 11A to 11D. FIG. 11A is a time chart showing a flow rate measurement example in the path #1, FIG. 11B is a time chart showing a zero compensation value measurement example in the path #1, FIG. 11C is a time chart showing a flow rate measurement example in the path #2, and FIG. 11D is a time chart showing a zero compensation value measurement example in the path #2. The horizontal axes of FIGS. 11A to 11D indicate time t.

In the embodiment, to obtain the flow rate data D50 to find the mass flow rate Q of a fluid, two types of basic repeated processing are similar to those of the first to third embodiments. The case where the switch circuit 35 selects the upstream coil signal S101 in initialization is taken as an example.

Figure 10:
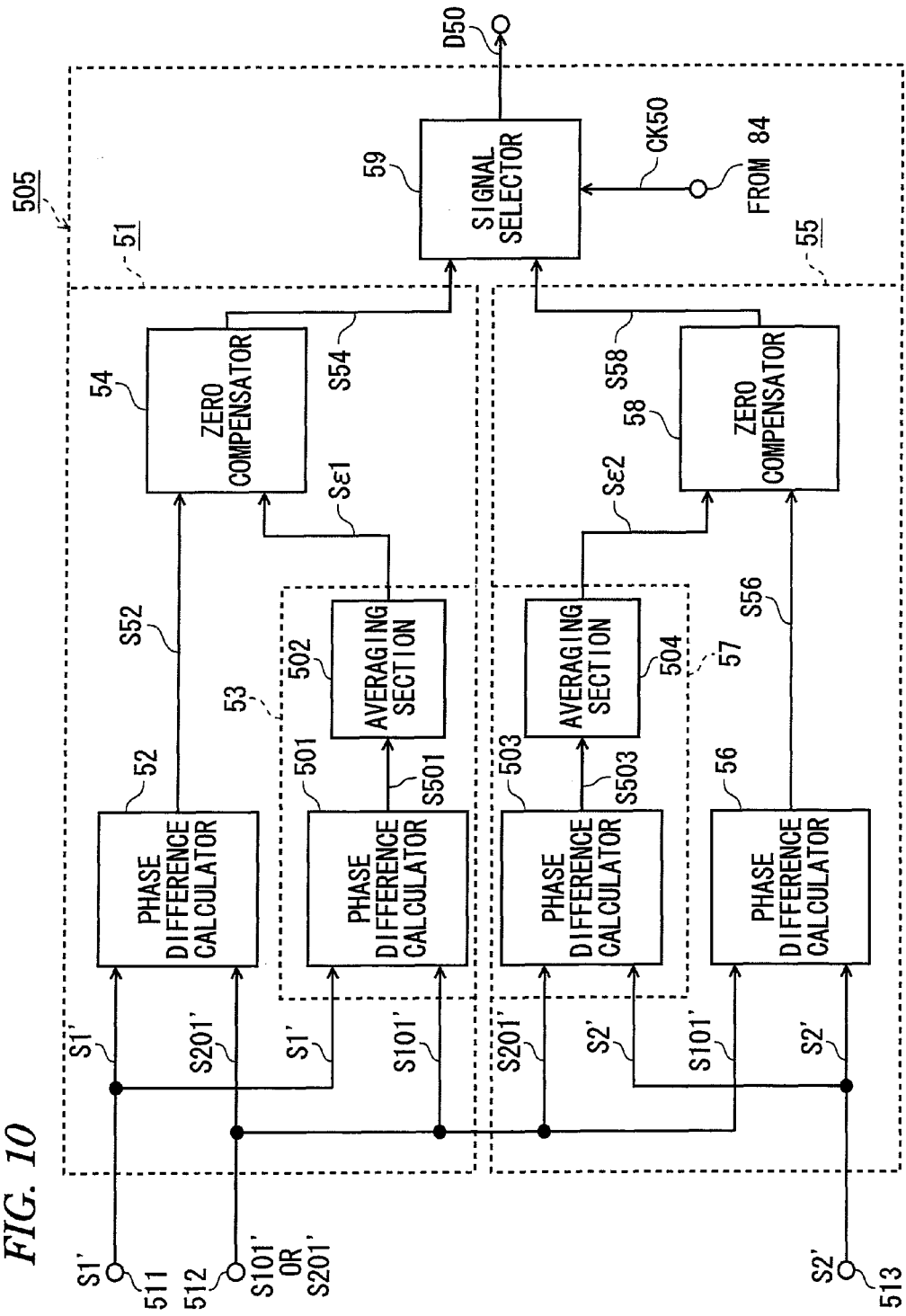
FIG. 10 is a block diagram showing an internal configuration example of a digital signal processing circuit 505.

With this as an operation condition, according to the operation example of the converter 74 shown in FIG. 10, to execute the first processing as described in the first embodiment, the upstream coil signal S1 output from the detector 60 shown in FIG. 1 is input to the input amplifier 1. The input amplifier 1 amplifies the upstream coil signal S1 and outputs the amplified upstream coil signal S1 to the A/D converter 43. The downstream coil signal S2 is input to the input amplifier 2. The input amplifier 2 amplifies the downstream coil signal S2 and outputs the amplified downstream coil signal S2 to the A/D converter 43.

In time period (1) shown in FIG. 11A, the switch circuit 35 switches connection from the upstream coil signal S101 to the downstream coil signal S201 so as to input the downstream coil signal S201 to the input amplifier 36 based on the clock signal CK3. The input amplifier 36 amplifies the downstream coil signal S201 and outputs the amplified downstream coil signal S201 to the A/D converter 43.

The A/D converter 43 converts the amplified analog upstream coil signal S1 and the amplified analog downstream coil signals S2 and S201 into digital signals and outputs the digital upstream coil signal S1' and the digital downstream coil signals S2' and S201' to the digital signal processing circuit 505. In the digital signal processing circuit 505, the signal processor 51 shown in FIG. 10 calculates the difference between the upstream coil signal S1' and the downstream coil signal ST in the first time period (1) shown in FIG. 11A and outputs the first flow rate signal S52. The flow rate signal S52 is provided by calculating the difference between the upstream coil signal S1' and the downstream coil signal S201' by the phase difference calculator 52 of the signal processor 51. The flow rate signal S52 is output to the zero compensator 54.

On the other hand, the signal processor shown in FIG. 10 detects the difference between the downstream coil signal S2' and the downstream coil signal S201' and generates the zero compensation value Sϵ2 in the first time period (1) shown in FIG. 11D. At this time, in the zero compensation value generator 57, when the phase difference calculator 503 calculates the difference between the downstream coil signal ST and the downstream coil signal S201', the averaging section 504 averages the difference output signal S503 of the phase difference calculator 503 and generates the zero compensation value Sϵ2. The zero compensation value Sϵ2 is output to the zero compensator 58.

Accordingly, the phase difference between the upstream coil signal S1' and the downstream coil signal S201' corresponding to the flow rate signal S52 is measured in the path #1 and the net phase difference of the flow rate signal S52 can be found using the previously calculated first zero compensation value Sϵ1' in the path #1 and concurrently with the processing, the phase difference between the downstream coil signal ST and the downstream coil signal S201' (second zero compensation value component) can be measured in the path #2.

Then, in the example, time period (2)' exists. The time period (2)' is the time until data held in the A/D converter 43, data used for filtering, etc., is switched by the switch circuit 35 and is replaced with data after the switch as described in the first to third embodiments. Operation as described in the first embodiment is not adopted during the time period (2)'.

According to the operation example of the converter 74 passing through the time period (2)', to execute second processing described in the first embodiment, the upstream coil signal S101 output from the detector 60 shown in FIG. 1 is output to the A/D converter 43 through the input amplifier 36.

In the example, the switch circuit 35 switches connection from the upstream coil signal S201 to the upstream coil signal S101 so as to input the upstream coil signal S101 to the input amplifier 36 based on the clock signal CK3 in the time period (2)' shown in FIG. 11C. The input amplifier 36 amplifies the upstream coil signal S101 and outputs the amplified upstream coil signal S101 to the A/D converter 43. The A/D converter 43 converts the amplified analog upstream coil signal S101 into a digital signal and outputs the digital upstream coil signal S101' to the digital signal processing circuit 505.

In the digital signal processing circuit 505, the signal processor 55 shown in FIG. 10 calculates the difference between the downstream coil signal S2' and the upstream coil signal S101' in the first time period (3) shown in FIG. 11C and outputs the second flow rate signal S56. The flow rate signal S56 is provided by calculating the difference between the downstream coil signal S2' and the upstream coil signal S101' by the phase difference calculator 56 of the signal processor 55. The flow rate signal S56 is output to the zero compensator 58. The zero compensator 58 subtracts the zero compensation value Sϵ2 from the flow rate signal S56. Accordingly, it is made possible to correct the flow rate signal S56 with the zero compensation value Sϵ2 generated in FIG. 11D.

On the other hand, the signal processor 51 shown in FIG. 10 detects the difference between the upstream coil signal S1' and the upstream coil signal S101' and generates the zero compensation value Sϵ1. At this time, in the zero compensation value generator 53, when the phase difference calculator 501 calculates the difference between the reference signal 1' and the reference signal 101', the averaging section 502 averages the difference output signal S501 of the phase difference calculator 501 and generates the zero compensation value Sϵ1. The zero compensation value Sϵ1 is output to the zero compensator 54 and corrects the first flow rate signal S52 in the next (second) time period (1) shown in FIG. 11A. At this time, the zero compensator 54 subtracts the zero compensation value Sϵ1 from the flow rate signal S52.

Likewise, the zero compensation value Sε2' obtained in the time period (1) shown in FIG. 11D corrects the second flow rate signal S56 in the next (second) time period (3) shown in FIG. 11C. The flow rate signal S52 output from the zero compensator 54 and the flow rate signal S56 output from the zero compensator 58 are input to the signal selector 59. The signal selector 59 alternately selects the corrected flow rate signal S54 and the corrected flow rate signal S56 based on the clock signal CK50 and continuously outputs the signal as the flow rate data D50 to the CPU 6.

Accordingly, the phase difference between the downstream coil signal ST and the upstream coil signal S101' corresponding to the flow rate signal S56 is measured in the path #2 and the net phase difference of the flow rate signal S56 can be found using the previously calculated second zero compensation value Sε2 in the path #2 and concurrently with the processing, the phase difference between the upstream coil signal S1' and the upstream coil signal S101' (first zero compensation value component) can be measured in the path #1.

Table 4 lists combinations of the upstream coil signals S1' and S101' and the downstream coil signals S2' and S201' transmitted through the path #1 and the path #2.

TABLE 4

| Time period No. | Path #1 | | Path #2 | |
|---|---|---|---|---|
| | Signal 1 | Signal 2 | Signal 1 | Signal 2 |
| (1) | Upstream coil signal S1' | Downstream coil signal S202' | Downstream coil signal S201' | Downstream coil signal S2' |
| (3) | Upstream coil signal S1' | Upstream coil signal S101' | Upstream coil signal S101' | Downstream coil signal S2' |

According to Table 4, signal 1 transmitted through the path #1 in the time period (1) is the upstream coil signal S1' and signal 2 is the downstream coil signal S201'. Signal 1 transmitted through the path #2 is the downstream coil signal S201' and signal 2 is the downstream coil signal S2'. The time period (2)' is undefined and therefore is not described.

Signal 1 transmitted through the path #1 in the time period (3) is the upstream coil signal S1' and signal 2 is the downstream coil signal S101'. Signal 1 transmitted through the path #2 is the upstream coil signal S101' and signal 2 is the downstream coil signal S2'.

Thus, according to the Coriolis mass flowmeter 400 as the fourth embodiment, the converter 74 includes the single switch circuit 35 and connection of the upstream coil S101 and the downstream coil signal S201 is switched in a time division manner so as to input either the upstream coil signal S101 or the downstream coil signal S201 output from the Detector to the input amplifier 36.

Therefore, the two paths #1 and #2 can share the switch circuit 35, so that the upstream coil signal S101 or the downstream coil signal S201 can be input to the converter 74 in time series and the zero compensation values Sε1 and Sε2 can be calculated. Moreover, it is possible to sufficiently increase the number of pieces of data to determine the zero compensation values S61 and S62 as compared with the conventional example, and the stable zero compensation values Sε1 and Sε2 can be provided. The number of switch circuits and the number of input amplifiers can be decreased and the cost of the Coriolis mass flowmeter 400 can be reduced as compared with the first to third embodiments.

The CPU 6 of each of the converters 71 to 74 according to the first to fourth embodiments has a diagnosis function. The CPU 6 conducts diagnosis of the path #1 and the path #2 based on the zero compensation value Sε1 to correct the flow rate signal S52 and the zero compensation value Sε2 to correct the flow rate signal S56. For example, to conduct a diagnosis of the path #1, a comparison is made between the zero compensation value Sε1 and a determination reference value Rth and if the zero compensation value Sε1 becomes beyond a given value, an alarm is output. To conduct a diagnosis of the path #2, a comparison is made between the zero compensation value Sε2 and the determination reference value Rth and if the zero compensation value Sε2 becomes beyond a given value, for example, exceeds the determination reference value Rth, an alarm is output.

In the description of the first to fourth embodiments, the converters 71 to 74 are implemented as hardware, but may be implemented as software. In the description of the first to fourth embodiments, the fluctuation factor is corrected in the digital signal processing circuits 50, 50', and 505, but the zero compensation value may be calculated in the digital signal processing circuits 50, 50', 505, etc., and a correction may be made in the CPU 6.

Further, in the description of the first to fourth embodiments, the fluctuation factor is corrected in the digital signal processing circuits 50, 50', and 505, but the CPU 6 may calculate the zero compensation value to correct the fluctuation factor and may make a correction.

In the description of the first to fourth embodiments, the branch point a, b, etc., of the upstream coil signal S1 and the downstream coil signal is provided in the converter 71, 72, 73, 74, but may be provided in the detector 60 or at midpoint of the detector 60 and the converter 71, 72, 73, 74, etc. In the description of the first to fourth embodiments, the switch circuit 3, 23, 24, 31-35 are provided in the converter 71, 72, 73, 74, but may be provided in the detector 60 or at midpoint of the detector 60 and the converter 71, 72, 73, 74, etc.

In the description of the first to fourth embodiments, a single A/D converter is used for the A/D converter 40, 43, but the A/D converter 40 or 43 may be made up of a plurality of A/D converters.

In the description of the first to fourth embodiments, a straight pipe is used for the tube 15, but if a U pipe is used as the tube 15, the invention can be applied.

The invention is extremely suitably applied to a Coriolis mass flowmeter which has a correction function of a phase difference measurement error and measures the mass flow rate, the density, the volume flow rate, etc., of a fluid from the phase difference between an upstream coil signal and a downstream coil signal.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A Coriolis mass flowmeter for vibrating a pipe line through which a fluid flows and measuring a mass flow rate of the fluid flowing through the pipe line, based on a phase difference between an upstream vibration signal and a downstream vibration signal, wherein the upstream vibration signal is detected in an upstream side of the pipe line, and the downstream vibration signal is detected in a downstream side of the pipe line, the flowmeter comprising:

a flow rate signal calculator comprising:
  a first signal processor; and
  a second signal processor,
wherein the upstream vibration signal is divided into at least a first upstream vibration signal that flows through a first path and a second upstream vibration signal that flows through a second path,
wherein the downstream vibration signal is divided into at least a first downstream vibration signal that flows through the second path and a second downstream vibration signal that flows through the first path,
wherein the first signal processor is provided on the first path to calculate a first flow rate signal that represents a phase difference between the first upstream vibration signal and the second downstream vibration signal, and then correct the calculated first flow rate signal, and
wherein the second signal processor is provided on the second path to calculate a second flow rate signal that represents a phase difference between the second upstream vibration signal and the first downstream vibration signal, and then correct the calculated second flow rate signal.

2. The Coriolis mass flowmeter of claim 1,
wherein the first signal processor is configured to calculate a first zero compensation value, based on at least one of the upstream vibration signal, the downstream vibration signal and a certain reference signal, and
the first signal processor is configured to correct the calculated first flow rate signal based on the first zero compensation value,
wherein the second signal processor is configured to calculate a second zero compensation value, based on at least one of the upstream vibration signal, the downstream vibration signal and the certain reference signal, and
the second signal processor is configured to correct the calculated second flow rate signal based on the second zero compensation value,
wherein the corrected first flow rate signal and the corrected second flow rate signal are alternately repeated without time interval therebetween.

3. The Coriolis mass flowmeter of claim 2,
wherein the upstream vibration signal is divided into a third upstream vibration signal that flows through the first path, in addition to the first upstream vibration signal and the second upstream vibration signal, and
wherein the downstream vibration signal is divided into a third downstream vibration signal that flows through the second path, in addition to the first downstream vibration signal and the second downstream vibration signal,
wherein the flowmeter further comprises:
a first switch circuit provided on the first path to switch between the third upstream vibration signal and the second downstream vibration signal; and
a second switch circuit provided on the second path to switch between the third downstream vibration signal and the second upstream vibration signal, and
wherein the first signal processor is configured to calculate the first zero compensation value, based on a phase difference between the first upstream vibration signal and the third upstream vibration signal,
wherein the second signal processor is configured to calculate the second zero compensation value, based on a phase difference between the first downstream vibration signal and the third downstream vibration signal,
wherein the flow rate signal calculator further comprises:
  a signal selector configured to alternately output the corrected first flow rate signal and the corrected second flow rate signal,
wherein the first signal processor calculates the first flow rate signal or the first zero compensation value, while the second signal processor detects the second flow rate signal, and
wherein the second signal processor calculates the second flow rate signal or the second zero compensation value, while the first signal processor detects the first flow rate signal.

4. The Coriolis mass flowmeter of claim 2, further comprising:
a reference signal generator configured to generate the certain reference signal, wherein the certain reference signal is divided into a first reference signal, a second reference signal, a third reference signal and a fourth reference signal;
a first switch circuit provided on the first path to switch between the first upstream vibration signal and the first reference signal;
a second switch circuit provided on the first path to switch between the second downstream vibration signal and the second reference signal;
a third switch circuit provided on the second path to switch between the second upstream vibration signal and the third reference signal; and
a fourth switch circuit provided on the second path to switch between the first downstream vibration signal and the fourth reference signal.

5. The Coriolis mass flowmeter of claim 4,
wherein the first signal processor comprises:
  a first zero compensation value generator configured to calculate the first zero compensation value, based on a phase difference between the first reference signal and the second reference signal,
wherein the second signal processor comprises:
  a second zero compensation value generator configured to calculate the second zero compensation value, based on a phase difference between the third reference signal and the fourth reference signal.

6. The Coriolis mass flowmeter of claim 2, wherein the flow rate signal calculator comprises:
  a controller configured to diagnose the first and second paths based on the first and second zero compensation values, respectively.

* * * * *